(12) United States Patent
Allen

(10) Patent No.: US 9,448,827 B1
(45) Date of Patent: Sep. 20, 2016

(54) STUB DOMAIN FOR REQUEST SERVICING

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 125 days.

(21) Appl. No.: 14/106,644

(22) Filed: Dec. 13, 2013

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 6,134,581 A * | 10/2000 | Ismael et al. | 709/202 |
| 6,751,798 B1 * | 6/2004 | Schofield | 719/330 |
| 6,851,118 B1 * | 2/2005 | Ismael et al. | 719/330 |
| 6,868,543 B1 * | 3/2005 | Nusbickel | 719/318 |
| 8,103,740 B1 * | 1/2012 | Abramov et al. | 709/217 |
| 8,413,146 B1 * | 4/2013 | McCorkendale et al. | 718/1 |
| 8,424,007 B1 * | 4/2013 | Hernacki et al. | 718/103 |
| 8,924,534 B2 * | 12/2014 | Suri et al. | 709/224 |
| 2007/0156981 A1 * | 7/2007 | Bitner et al. | 711/159 |
| 2007/0157001 A1 * | 7/2007 | Ritzau | 711/170 |
| 2007/0180223 A1 * | 8/2007 | Fok et al. | 709/223 |
| 2008/0022032 A1 * | 1/2008 | Nicholas et al. | 711/100 |
| 2008/0052181 A1 * | 2/2008 | Devitt-Carolan et al. | 705/26 |
| 2008/0072244 A1 * | 3/2008 | Eker et al. | 719/330 |
| 2008/0086567 A1 * | 4/2008 | Langen et al. | 709/230 |
| 2008/0107064 A1 * | 5/2008 | Erol et al. | 370/316 |
| 2008/0123854 A1 * | 5/2008 | Peel et al. | 380/277 |
| 2008/0163248 A1 * | 7/2008 | Chen | 719/313 |
| 2008/0307190 A1 * | 12/2008 | Arndt et al. | 711/203 |
| 2009/0007100 A1 * | 1/2009 | Field et al. | 718/1 |
| 2009/0204963 A1 * | 8/2009 | Swart et al. | 718/1 |
| 2010/0070678 A1 * | 3/2010 | Zhang et al. | 711/6 |
| 2011/0099267 A1 * | 4/2011 | Suri et al. | 709/224 |
| 2011/0252271 A1 * | 10/2011 | Frenkel et al. | 714/4.1 |
| 2012/0117563 A1 * | 5/2012 | Chang et al. | 718/1 |
| 2012/0227038 A1 * | 9/2012 | Hunt et al. | 718/1 |
| 2012/0233435 A1 * | 9/2012 | Ben-Yehuda et al. | 711/170 |
| 2012/0254866 A1 * | 10/2012 | Iwamatsu et al. | 718/1 |
| 2012/0284790 A1 * | 11/2012 | Bhargava | 726/22 |
| 2012/0290765 A1 * | 11/2012 | Durrant | 711/6 |
| 2013/0155083 A1 * | 6/2013 | McKenzie et al. | 345/522 |
| 2013/0160011 A1 * | 6/2013 | Corrie | 718/1 |
| 2013/0227553 A1 * | 8/2013 | Tsirkin et al. | 718/1 |
| 2013/0339568 A1 * | 12/2013 | Corrie | 711/6 |
| 2014/0089907 A1 * | 3/2014 | Cabillic et al. | 717/147 |

(Continued)

*Primary Examiner* — Emerson Puente
*Assistant Examiner* — Mehran Kamran
(74) *Attorney, Agent, or Firm* — Davis Wright Tremaine LLP

(57) ABSTRACT

Techniques for reclaiming resources from guest computing systems while those systems are waiting for responses to requests in virtualized and/or distributed computer systems are described herein. At a time after issuing a request and determining that the response will take longer than a threshold length of time, one or more computer system entities within a computer system invoke one or more computer system capabilities to at least instantiate a listener object, transfer the listener object to another system domain, suspend the guest computing system and reclaim resources from the suspended guest computing system. When the response is returned to the listener object, the guest computer system is restored and the response is forwarded to the restored guest. While the guest computing system is suspended, the reclaimed resources are made available to other computer system entities.

24 Claims, 13 Drawing Sheets

(56) References Cited

U.S. PATENT DOCUMENTS

| | | |
|---|---|---|
| 2014/0149490 A1* | 5/2014 | Luxenberg et al. .......... 709/203 |
| 2014/0164723 A1* | 6/2014 | Garthwaite et al. .......... 711/162 |
| 2014/0165060 A1* | 6/2014 | Muller et al. ..................... 718/1 |
| 2014/0168293 A1* | 6/2014 | Moreau et al. ................... 347/2 |
| 2014/0173213 A1* | 6/2014 | Beveridge ..................... 711/130 |
| 2014/0181291 A1* | 6/2014 | Palazzolo ..................... 709/224 |
| 2015/0032884 A1* | 1/2015 | Greifeneder et al. ........ 709/224 |
| 2015/0074685 A1* | 3/2015 | Baeuerle et al. ............. 719/318 |
| 2015/0150002 A1* | 5/2015 | Kruglick ........................... 718/1 |

\* cited by examiner

STUB DOMAIN FOR REQUEST SERVICING

BACKGROUND

Modern computer systems frequently interact with remote systems and applications, sending requests to these remote systems and waiting for responses. During the time between when a request is made to a remote system and a response is received, such systems may not be able to perform any other work, and may remain idle while still consuming resources such as memory, central processing unit and other such resources. In computer systems involving virtualized computing environments, where a plurality of guest machines may share such computer resources, expending resources on idle machines may potentially cause resource shortages as those resources may not be available to other guest virtual machines. Such resource shortages may lead to resource contention and may lead to system slowdowns, system delays and/or system outages which may, in turn, adversely affect overall system performance. In systems where a host system may support multiple guest virtual machines, the ability of a system to reclaim resources from idle machines and redistribute those resources to active machines may become important to maintaining system performance.

BRIEF DESCRIPTION OF THE DRAWINGS

Various embodiments in accordance with the present disclosure will be described with reference to the drawings, in which.

DETAILED DESCRIPTION

Figure 1:
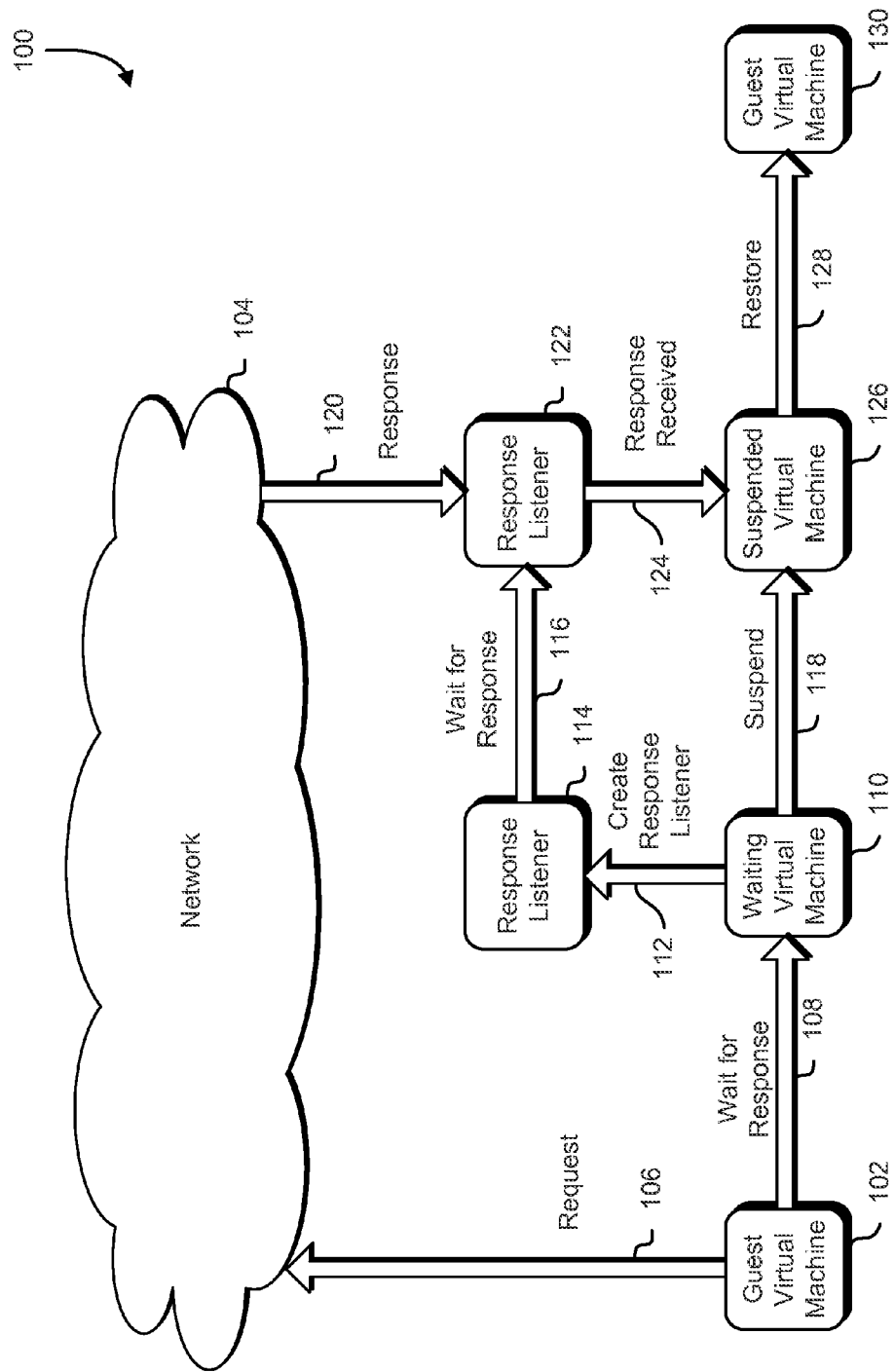
FIG. 1 illustrates an example environment where a guest virtual machine may be suspended while waiting for a response in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for managing resources on computing systems and executable code operating thereon. In particular, techniques are disclosed for utilizing processor capabilities to facilitate redistribution of system resources such as memory, central processing units (CPUs), system storage, other system hardware and the like, by and for operational elements of computer systems, including, but not limited to, hypervisors, operating systems, guest operating systems and guest applications, while a plurality of these operational elements are operating on one or more computer systems. A distributed and/or virtualized computer system may benefit from efficient management of computer system resources in order to facilitate better system performance. In computer systems where system resources may be oversubscribed, effectively reclaiming unused or underutilized resources from guest virtual machines, including resources such as CPU cycles, memory and other such finite resources, and redistributing those resources to other systems may serve to keep all such elements functioning efficiently. Without effective management of resources, the resources may become scarce and/or unavailable, leading to system slowdowns, reductions in performance, failure of running applications and/or failure of the operational elements. Ineffective management of system resources may also, in some embodiments, require a system to be configured with additional hardware resources in order to maintain high levels of performance.

In an illustrative example, a computer system with a plurality of guest virtual machines may exhibit decreased system performance when certain resources become scarce. A system may exhibit decreased performance when shared system resources including, but not limited to, system memory, system disk resources, network resource, disk input-output bandwidth, socket handles, network handles, file handles or other such operating system limited resources become scarce. In such shared and/or virtual systems, a tightly constrained, finite resource, such as system memory, may become overcommitted in order to facilitate better overall system performance under the assumption that not all guest systems may need their full memory allocation at the same time. When resources become scarce, the resources may be temporarily reallocated from one system to another in order to keep one operating at full efficiency. The deleterious effect that this reallocation may have on the system that gives up system resources such as memory and CPU cycles may be greatly reduced if that system is mostly idle and not using some or all of its resources for some period of time, provided the resources may be returned before the donating system needs them.

Techniques disclosed herein include employing resource management techniques for managing computer system resources using a resource manager such as a hypervisor on a computer system implementing a system virtualization technique whereon a plurality of guest virtual machines running on one or more host computer systems have been implemented. In some embodiments, a guest virtual machine (also referred to as a virtual machine, a VM, a virtual machine instance, a guest instance, a guest machine, a guest domain, an application domain or other such terms) or an application running thereon may issue a request to a second computer system, service or resource. The request may be one of the many possible types of requests that may be made by one computer system to another computer system, service or resource such as, but not limited to, a request for data, a request to perform some calculation, a request to update some data on the remote system, a request to validate credentials, a request for website display pages and/or data, a request to update a shared virtual space or a combination of these and/or other types of requests. In some embodiments, the second computer system, service or resource may be running on the same computer system as the guest virtual machine or application, or it may be running on a different computer system or it may be running on a combination of nodes operating on both locally and remotely. The guest virtual machine or application running on the guest virtual machine and the second computer system, service or resource may be connected to each other via a number of mechanisms including, but not limited to, a network such as a local network, an internal network, a system backplane, a public network such as the Internet, a wide-area network, a wireless network, a mobile network, a distributed computing system with a plurality of network nodes and/or a combination of these and/or other network elements.

In some embodiments, the request issued by a guest virtual machine to a second computer system, service or resource may require a response. For example, if a purchasing application on a guest virtual machine issues a request to a credit card processing service to validate a credit card transaction, the guest virtual machine requires a response from the credit card processing service before the purchasing application can complete. The response to this request may be, for example, an acceptance of the purchase, or a denial of the purchase, or a notification that the request was received and will be processed later or a number of other such responses. As may be contemplated, when a guest virtual machine sends a request to a second computer system, service or resource that guest virtual machine may not be able to perform any other actions until a response is received. In such systems where a response is required before proceeding, the guest machine may be in a spinning or busy-wait state until the response returns, and it may be consuming system resources such as memory, CPU cycles or other such resources, while it may not be actually accomplishing any useful work. In some embodiments, where the system may be waiting for a relatively long time before the response returns, the requesting guest virtual machine or application may be paused and/or suspended during the request in order to free the underutilized resources provided that some mechanism may be provided to restore the guest virtual machine at least by the time that the response returns and/or to receive the response when it arrives.

In some embodiments, a guest virtual machine or an application running thereon may issue a request to a second computer system, service or resource. The request may be issued using a standard request-reply protocol such as hypertext transfer protocol (HTTP), secure shell (SSH), remote desktop protocol (RDP), remote procedure call (RPC) or may be issued using techniques from some higher level language such as Java, JavaScript, Ruby, C++ and the like or may be issued with an informal, custom, ad-hoc or other such mechanism for associating requests and replies. As may be contemplated, the guest virtual machine or an application running thereon may determine that it has no useful work to perform until the response returns from the second computer system, service or resource. The determination that there is no useful work to perform may be performed by the application itself, or by a controller element on the virtual machine or by a process running on, or under control of, a controlling domain such as a hypervisor or a domain zero on the host computer system or by a combination of these and/or other system elements.

The guest machine or an application running thereon may further determine that it is likely that the response may take a considerable length of time to complete and that the considerable length of time may be greater than a defined, derived and/or determined threshold length of time. For example, in some embodiments, the threshold length of time may be set by the host system as a static value and any response time that exceeds that threshold length of time may make the candidate guest machine a candidate for suspension. In some embodiments, threshold length of time may be initially set by the host system, but may also be adjusted by the host system as the demand for one or more system resources increases and/or decreases. In some embodiments, the threshold may be set by the guest machine based on such factors as past performance of similar response times and in such embodiments, the guest machine may nominate itself for suspension by, for example, sending a message, command, API call or other such communication to a controlling domain or other such process on the host machine. As may be contemplated, a computer system may use a combination of these and/or other such mechanisms for setting and/or adjusting the threshold. As also may be contemplated, a computer system may also maintain a plurality of thresholds and may choose to apply different thresholds to different users, machines or applications based on a variety of system factors including, but not limited to, the time of day, system resource loading, classification of guest machines, classification of customers and/or owners of guest machines or a combination of these and/or other such system factors.

The determination that the response may take a considerable length of time to complete may be performed by the application itself, or by a controller element on the virtual machine or by a process running on, or under control of, a controlling domain such as a hypervisor on the host computer system or by a combination of these and/or other system elements. The determination that the response may take a considerable length of time to complete may be based on a number of factors including, but not limited to, the nature of the request, the nature of the second computer system, service or resource, the distance, latency, bandwidth or other such factors of connectivity between the two systems, whether the second computer system, service or resource may forward the request to a third and/or subsequent computer systems, services or resources, historical data about past similar requests, performance heuristics, an explicit configuration value entered by an application developer and/or a combination of these and/or other such factors. The determination of what may constitute a considerable length of time for the response, and thus whether this guest virtual machine may be a good candidate for suspension and reclamation of resources may also depend on a number of factors including, but not limited to, the length of time it may take to suspend the guest virtual machine, the length of the time it may take to reclaim the resources, the length of time it may take to return the reclaimed resources, the length of time it may take to restore the guest virtual machine, configuration factors of the guest virtual machine including the type of machine, the type of customer, the business value of the machine and other such factors, overall system policies and/or a combination of these and/or other such factors.

As may be contemplated, the amount of memory associated with and the complexity of a guest virtual machine and of the application or applications running thereon may be a determining factor in deciding whether a guest virtual machine may be a good candidate for suspension and reclamation. For example, a guest virtual machine with only a single application and a small amount of memory may be suspended and restored very quickly and thus, it may be beneficial to suspend the machine even during a comparatively short wait for a response and even though suspending such a machine may only yield a small amount of reclaimed resources. By contrast, a large and complex guest virtual machine may not be a good candidate for suspension for anything except very lengthy waits because the overhead associated with suspension and restoring such a machine may counter the benefits of reclaiming more resources.

In the event that it is determined that due to the nature of the request and/or the nature of the guest virtual machine, a particular guest virtual machine is a good candidate for suspension while waiting for a response, the guest virtual machine or an application running thereon may create a listener stub that is at least configured to wait for and receive the response. In some embodiments, the guest virtual machine on an application running thereon may create a listener stub by authoring a stub configuration and transferring that stub configuration to a stub domain. In some embodiments, a stub domain may be a system, process, application or other such entity running on the host machine under the control of controlling domain such as a hypervisor. A stub domain may be configured to at least receive stub configurations and to receive and process responses according to directions contained in or associated with stub configurations. A stub configuration may contain a handling plan which may contain data, information and/or instructions describing a one or more conditional handlers for the response to the request. In some embodiments, the handling plan and/or the conditional handlers may include information including, but not limited to, one or more network interfaces of the requesting machine, hostnames for the guest and/or second systems, port names and/or ids for the guest and/or second systems, system addresses, network and/or other protocols, interaction instructions such as application contracts, message request and response correlation identifiers, machine instance identifiers, application identifiers and/or a combination of these and/or other such information that may be useful for associating responses to requests and/or may be useful for processing responses.

In some embodiments, a conditional handler may include logic that may specify at least how to react to a certain response. For example, in an embodiment where a request is sent using a standard request-reply protocol such as HTTP, a set of one or more conditional handlers may include a first conditional handler to receive and discard an HTTP 100 (Continue) response, may include a second conditional handler to receive and process an HTTP 200 (OK) response, may include a third conditional handler to receive and buffer the results of an HTTP 206 (Partial Content) response and may include fourth and subsequent conditional handlers to receive and handle HTTP errors such as 400 (Bad Request), 403 (Forbidden) or 404 (Not Found). In some embodiments, conditional handlers for common responses such as for the OK and HTTP error codes may be incorporated into the stub domain itself and/or they may be included as necessary in each conditional handler. In another example, such as in the purchasing system described herein, the conditional handlers may include conditional handlers for responses from the credit card system that indicate whether the transaction was approved, denied or whether some error occurred and what are the appropriate responses. In some embodiments, configuration options including, but not limited to, maximum wait times before a timeout, maximum number of retries or other such options may be included in the stub configuration along with conditional handlers indicating what action or actions should be taken as a result of violations of such configuration options. As may be contemplated, other types of conditional handlers may be considered as being within the scope of the present disclosure.

As may be contemplated, when a guest virtual machine or an application running thereon sends a request to a second computer system, service or resource, the guest virtual machine may have created and/or attached to a listener socket to receive the request as part of the process of making a request. The guest virtual machine may create a listener stub by combining the stub configuration with information about the listener socket such as a socket handle, and providing the combined information to the stub domain. In some embodiments, the guest virtual machine may duplicate the listener socket handle as part of the process for creating a listener stub, thus creating two listener socket handles. The guest virtual machine may then transfer the duplicated listener socket handle together with the stub configuration to the stub domain. In some embodiments, the guest virtual machine may retain the original listener socket handle or it may destroy the original listener socket handle. In some embodiments, the listener socket handle may be included in the stub configuration or it may be separate from the stub configuration. The combined stub configuration and listener socket handle may be transferred to the stub domain by a variety of mechanisms including, but not limited to, by sending a serialized message containing the combined information, or placing a message or some other such data structure in shared system memory and notifying the controlling domain or stub domain, or by placing the message or some other such data structure in a system queue that the stub domain checks periodically or by other such methods and/or mechanisms. In some embodiments, the guest virtual machine may not duplicate and transfer the listener socket handle to the stub domain but may instead transfer the information necessary to allow the stub domain to duplicate the listener socket handle. The stub domain may then in turn create the duplicate listener socket handle itself. The guest virtual machine or an application running thereon may, for example, specify a port and a protocol for the stub domain to use to construct and/or attach to a new socket in order to listen for a reply.

When the stub configuration and socket information have been transferred to the stub domain, the guest virtual machine or an application running thereon may be ready for suspension. In some embodiments, the guest virtual machine may communicate with the hypervisor or controlling domain that it is ready for suspension. The communication may be made via a hypervisor trigger event, or an application programming interface (API) call to the hypervisor or by some other such mechanism. In some embodiments, a process running on or under the control of the hypervisor may monitor transfers to the stub domain and may use the existence of such transfers at least as an indicator that a suspension may occur. In some embodiments, a process running on or under the control of the stub domain may similarly monitor transfers to the stub domain and may use the existence of such transfers at least as an indicator that a suspension may occur. The hypervisor or controlling domain, upon receiving an indicator that a guest virtual machine may be suspended, may at least pause the guest virtual machine, may additionally evict at least a portion of the guest virtual machine by copying memory pages and/or other resource state to a suspend storage location and may additionally reclaim the corresponding physical memory pages from the paused guest virtual machine in order that they may be provided to one or more other guest virtual machines or applications running thereon.

After receiving the listener stub, the stub domain may receive a response to the request. In some embodiments, and depending at least partially on the nature of the request and/or at least partially on the nature of the response, the stub domain may receive the entirety of the response or a portion of the response. As described herein, the response may be data that may be required by the requesting guest virtual machine or application or it may be a status or error response or it may be some other type of response. The stub domain may determine which of the one or more stub listeners that the response belongs to by, for example, comparing the response values to values stored in the one or more stub configurations. The stub domain may also determine how to process the response according to the conditional handlers of the appropriate stub configuration. In some embodiments, when the stub domain is not able to determine which stub listener a response belongs to, the stub domain may ignore the response, or it may alert the hypervisor, or it may alert a process running under the control of the hypervisor, or it may alert a process running on the host machine, or it may alert one or more of the other guest virtual machines or it may do a combination of these and/or other actions in response to the response. Similarly, if the stub domain is not able to locate an appropriate conditional handler for the response, the stub domain may also ignore the response, or it may alert the hypervisor, or it may alert a process running under the control of the hypervisor, or it may alert a process running on the host machine. In some embodiments, the stub domain, upon receiving an unrecognized or unknown response may have a default conditional handler that at least restores the suspended guest virtual machine and forwards the response to the restored guest virtual machine.

As part of processing the response, the stub domain may determine that the suspended guest virtual machine may be restored so that the guest virtual machine may further process the response. In the event that a partial response is received by the stub domain, the stub domain may determine that the suspended guest virtual machine may remain suspended until some or all of the remainder of the response may be received or it may determine that the guest virtual machine may be restored to deal with the partial response. As may be contemplated, conditional handlers can be devised to evaluate the amount and/or content of the response as well as the type or category of the response and to process the response accordingly. For example, a conditional handler for a request that requires the delivery of a stream of video may instruct the stub domain to save and buffer a portion of the video stream at the stub handler before restoring the suspended guest virtual machine or it may instruct the stub domain to restore the guest virtual machine when the entire video stream has been delivered or it may restore the guest virtual machine at the first frame and rely on the buffering capabilities of the guest.

After the stub domain makes the determination that the suspended guest virtual machine may be restored, the stub domain may communicate to the hypervisor to begin the restoration from the suspend storage. In some embodiments, the stub domain may communicate the request by sending a message to the hypervisor indicating which machine may be restored. While the hypervisor is restoring the suspended guest machine, the stub domain may continue receiving response data, including, but not limited to, further data for the current response, other responses and/or response data for the same suspended virtual machine and/or other responses and/or response data for other suspended virtual machines and the stub domain may process these additional responses and response data by caching the data, forwarding it, generating additional requests to the hypervisor, ignoring it, or a combination of these and/or other actions.

In some embodiments, once the hypervisor completes restoration of the suspended guest virtual machine including, but not limited to, reclaiming resources such as memory and CPU cycles from other guest virtual machines, restarting the guest virtual machine and/or restoring at least a portion of the applications running on the guest virtual machine, the hypervisor may signal the stub domain that the guest virtual machine is restored and ready to receive the response. As may be contemplated, if the response returns exceptionally rapidly, the guest virtual machine may not be fully suspended before it is time to restore it. For example, a response might generally take tens of seconds under normal circumstances but an error response that comes in as a result of, for example, a badly formed request, might return much more rapidly. In such systems, the hypervisor may stop the suspension and return the guest virtual machine to an operational state without bothering to complete the suspension in order to avoid the possible overhead of restoration.

With the guest virtual machine restored, and the response available, the stub domain may complete the process by forwarding the response to the guest virtual machine or an application running thereon. As mentioned previously, in some embodiments the guest virtual machine may have retained the original listener socket handle or it may have destroyed the original listener socket handle after transferring it to the stub listener or it may have never had a listener socket handle. In some embodiments where the socket was destroyed or where the socket never existed, the stub domain may transfer the response by opening a new socket connection on the guest domain and forwarding bytes received on the socket on the stub domain to the socket on the guest virtual machine. In such embodiments, the stub listener may remain in place on the stub domain until the response has been completely received in order to facilitate transferring the complete response. As may be contemplated, embodiments that may transfer the response data from the stub domain to the guest virtual machine may be implemented using a buffer to transfer the response data or may be implemented by directly forwarding data from the receiving socket on the stub domain to the receiving socket on the guest virtual machine.

In some embodiments where the guest virtual machine may have retained the original listener socket handle, the guest virtual machine may be restored in a state where it is ready to process the response without creation of a new socket listener handle. In such embodiments, the guest virtual machine may have been ready to receive a response when it was suspended and thus, may be ready to receive the response when it is restored. In these embodiments, the stub listener may be removed from the stub domain at any point after the guest virtual machine begins receiving the response data. As may be contemplated, in some embodiments the guest virtual machine may restored in a state that is not the same as the state that it was in when it was suspended. For example, some of the resources such as system memory, input output handles, system sockets, and/or other such system resources that may have been reclaimed by the host system when the guest virtual machine was suspended may not be returned to the guest machine when it is restored, or may be returned to the guest machine in an altered state. This change in state may occur at least in part due to a decision by the host system that, for example, the guest virtual machine may no longer have a requirement for those resources, or that the resources may be returned in a more efficient manner or due to other such resource optimization determinations.

In some embodiments, the stub domain may instead facilitate the transfer of the response by using a duplicate of the listener socket. In some embodiments where the guest virtual machine may not have retained the original listener socket handle, the stub domain and/or the hypervisor may transfer the reply by duplicating the listener socket handle on the guest virtual machine after it has been restored. The listener socket handle may be duplicated by sending a message back to a receiving process or application on the guest virtual machine, instructing it to create and reattach the appropriate listener socket handle. In such embodiments, the listener stub may be removed from the stub domain after the listener socket handler has been created and is receiving data. As may be contemplated, in any of the embodiments mentioned herein where the stub domain begins by reading the response data, the stub domain may need to rewind some portion of the received response to the socket stream before the suspended guest virtual machine begins processing the response so that the guest virtual machine may process the entirety of the response. In some embodiments this return may be accomplished by rewinding the stream, by re-queuing a portion of the received data, by using look ahead methods or by a combination of these and/or other methods. In some embodiments, the transfer of data from the stub domain may be accomplished by a combination of the methods mentioned herein. For example, a stub domain may receive a response, create a duplicate socket handler on the restored guest virtual machine, begin by transferring the already received response data to that socket handler and then, once the guest virtual machine has caught up, transfer control of the reception of the data to the duplicate socket handler on the restored guest. In some embodiments the response may be sent to the guest virtual machine by receiving the response at the stub domain, processing it, writing the response directly into the image of the suspended guest virtual machine and only then restoring the guest virtual machine. In such embodiments, the guest virtual machine may be restored in a state such that it appears to the guest virtual machine that it has already received the response and processed it. As may be contemplated, other types and combinations of methods for delivering the response to the restored guest virtual machine may be considered as being within the scope of the present disclosure.

There are many ways that the stub domain, the hypervisor, the guest virtual machine, an application running on the guest virtual machine and/or a combination of these and/or other computer system entities may receive a response, restore a suspended virtual machine, and transmit the response to the restored virtual machine. For example, as mentioned above, a stub domain may institute a general conditional handler for a time limit or timeout on receiving a response. Such a timeout may be handled by having the stub domain initiate a restore on the guest virtual machine and then having the stub domain generate an artificial timeout response to be sent to the restored guest virtual machine. The receiving guest domain or application running thereon may process the artificial timeout response as if it were a real timeout response by, for example, converting the response to an exception and using that exception to initiate appropriate timeout behavior. Alternately, and in some embodiments, under user control, the controlling domain may be configured to respond to a timeout by incrementing a counter and resending the request on behalf of the suspended guest virtual machine and only initiating a timeout event after a possibly configurable number of tries have been attempted. As may be contemplated, other types of restorations, responses, configurations and such may be considered as being within the scope of the present disclosure.

FIG. 1 illustrates an example environment 100 for suspending a guest virtual machine while waiting for a response on systems such as distributed and/or virtualized computer systems, as well as the associated code running thereon in accordance with at least one embodiment. A guest virtual machine 102, which may be one of a plurality of guest virtual machines on a computer system, sends a request 106 to a remote computer system, service or resource that may be connected to the guest virtual machine via a network 104. The request may be a request for data, or a request for status, or a request to complete a computation or may be a combination of one more of these and/or other types of requests. In some embodiments, when it may be determined that the guest virtual machine has no other work to perform while waiting for the response, it may be determined that the guest virtual machine should 108 enter a wait for a response state. It may be determined that the guest virtual machine may enter a wait for a response state based on a variety of factors, including, but not limited to, whether the guest virtual machine may have no other work to perform until the response returns, or whether the guest virtual machine may have at least no important and/or critical work to perform until the response returns, or whether other guest virtual machines have more important work to perform until the response returns, or whether the system is in a low-resource state and may need to force the guest virtual machine into a wait for response state, or because of the nature of the guest virtual machine, or because of the nature of the applications running on the guest virtual machine, or because of the business value of the guest virtual machine and/or the applications running thereon or because of a combination of these and/or other factors.

If the guest virtual machine 108 enters a wait for response state and becomes 110 a waiting virtual machine, it may be determined whether the guest virtual machine should be suspended and the resources reclaimed. In some embodiments, whether the guest may be suspended and the resources reclaimed may be decided based on a variety of factors, including, but not limited to, the amount of resources available for reclaiming from the guest virtual machine, the current scarcity of the resources, the amount of time it may take to suspend and restore the guest virtual machine, the presence and/or amount of any overhead associated with suspending and restoring the guest virtual machine, the nature of the guest virtual machine, the nature of the applications running on the guest virtual machine, the business value of the guest virtual machine and/or the applications running thereon or a combination of these and/or other factors. Both the decision to place the guest virtual machine and the decision to suspend the waiting guest virtual machine may be made by processes running on the guest virtual machine, or by processes running on a controlling domain such as a hypervisor, or by processes running on the host system, or by a process or processes running on another system, resource, or entity or by a combination of processes running on these and/or other computer systems, resources, or entities.

In the event that it is determined that the waiting virtual machine 110 should be suspended, the waiting guest virtual machine may first 112 create a response listener 114. In some embodiments, the response listener may be created as a set of one or more resource objects which may describe and/or implement actions and resources that may be used by the computer system to receive a response or reply to the previously sent request. The objects in the set of one or more resource objects may include, but not be limited to, such objects as network identifying information for the requesting guest virtual machine, network identifying information for one or more receiving computer systems, resources or services, one or more conditional handlers which may describe one or more actions to take depending on the response received, one or more timeout values, one or more actions to take as a response to timeouts, errors and/or other such system events and/or other such objects. In some embodiments, the response listener may be created by the guest virtual machine as a listening stub. A stub is an implemented interface with a set of functionality and/or actions and that is designed to wait for and respond to one or more external events such as one or more messages, one or more conditions, some data and/or a combination of these and/or other such events. As may be contemplated, a listener stub is a stub that is designed to listen for or wait for a response. The listener stub may then be transferred to one or more other processes on the host system that are configured to at least receive and implement the operations associated with listener stub objects such as, for example, a stub domain running under the control of a controlling domain such as a hypervisor. In some embodiments, the response listener may be created by the guest virtual machine as the description of a stub, and the described stub may be instantiated by another process or processes running on the host system. For example, the description of the listener stub may be instantiated by the stub domain where that stub domain is configured to at least receive stub descriptions, instantiate the described stub and implement the operations associated with listener stub objects.

After the response listener has been created, the response listener may 116 begin waiting for a response while the waiting virtual machine 110 may be 118 suspended. The waiting virtual machine may be suspended by sending a message to a controlling domain such as a hypervisor that the waiting virtual machine is ready to be suspended. The hypervisor or a process or processes running under the control of the hypervisor may manage the suspension of the waiting guest virtual machine by at least pausing the waiting virtual machine and writing its memory and other such resources to a suspend storage location. At some point later, the response listener 122 may receive a response or reply 120 from a remote computer system, service or resource that may be connected to the guest virtual machine via a network 104. The response may be one of one or more acceptable responses such as data requested, or the result of computation, or the beginning of a stream of data, or access to an external resource or any of a number of other responses. The response may also be a status message indicating that the response is still pending or one of a variety of errors and/or failures indicating the request has failed or may fail. As part of the one or more actions that may be associated with the response, the response listener may 124 notify the suspended virtual machine 126 that the response has been received which may 128 restore the 130 guest virtual machine.

Figure 2:
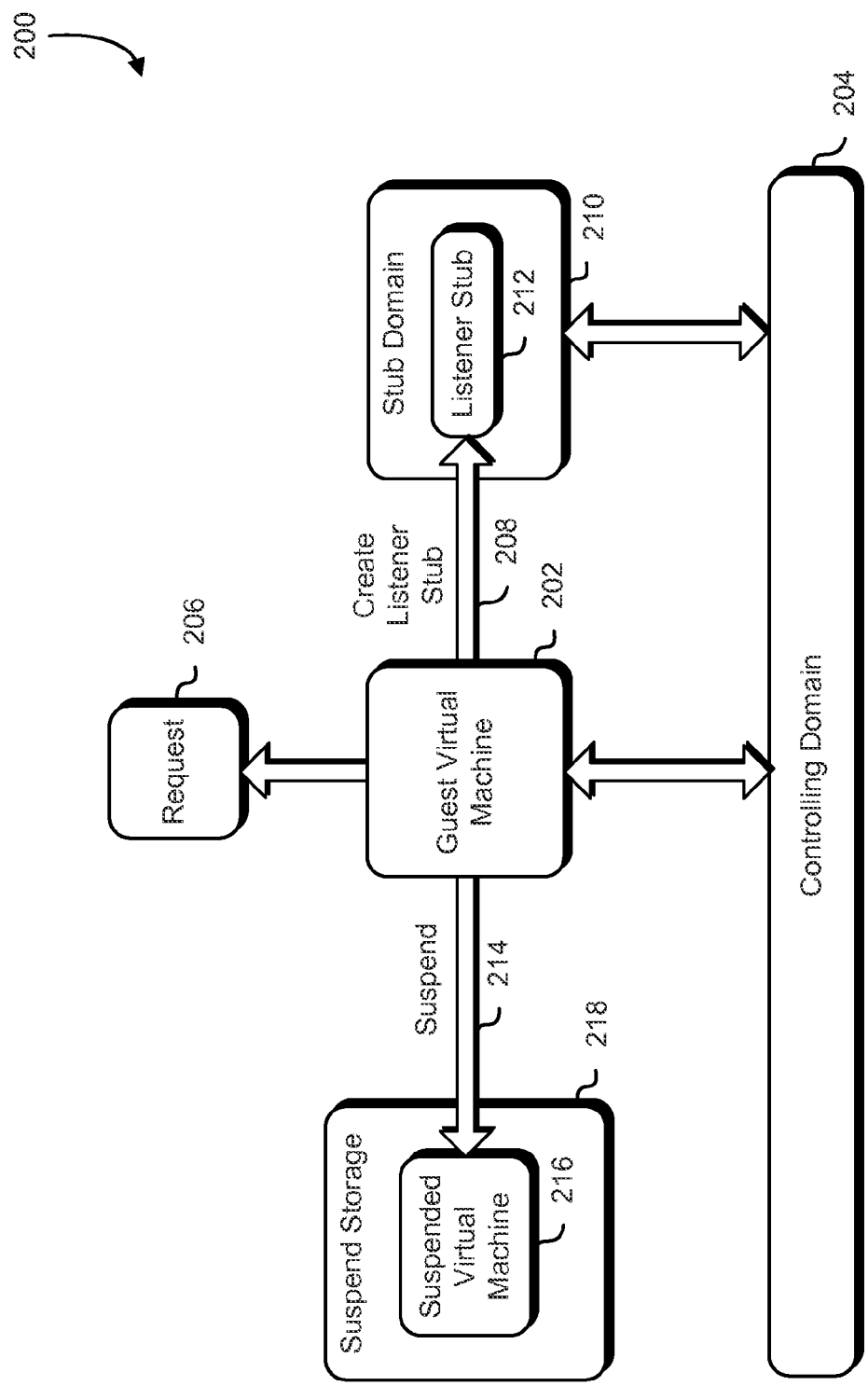
FIG. 2 illustrates an example environment where a guest virtual machine may begin the process of sending out a request, creating a listener and may be suspended in accordance with at least one embodiment.

FIG. 2 illustrates an example environment 200 where a guest virtual machine may be suspended while waiting for a response as described at least in connection with FIG. 1 and in accordance with at least one embodiment. A guest machine 202, running on a host machine and under the control of a hypervisor 204 may make a request 206 to a second computer system resource or service as described at least in connection with FIG. 1 and in accordance with at least one embodiment. One or more processes running on the guest machine and/or on some other computer system entity may determine that receiving a response to the request may take a substantial length of time and that the guest machine may be suspended from operations while waiting for the response to the request. In some embodiments, the guest machine may determine that the request may take a substantial length of time at least partially based on previous experience with other such requests, or at least partially based on past, current or predicted network and/or communications times, latency and/or available bandwidth, or at least partially based on other external system conditions or at least partially based on a combination of one or more of these and/or other such factors. In some embodiments, the guest machine may query a separate process running on the host machine or on some other computer system entity to determine the length of time that the response to the request may take. In some embodiments, the host machine or one or more processes running on the host machine may evaluate the request made by the guest machine and may make the determination of how long the response to the request may take. In some embodiments, the determination to suspend the guest machine may be made by the guest machine, or by a separate process running on the host machine or some other computer system entity, or by a controlling domain such as a hypervisor on the host machine or by a combination of these and/or other such computer system entities. The determination to suspend the guest machine may be at least partially based on one or more factors, including, but not limited to, whether the guest virtual machine may have other work it could perform, how long it may take to suspend and restore the guest machine, a predicted or measured amount of time it may take to receive a response to the request, current and/or predicted system load, current and/or predicted system resource needs, system policies, one or more valuations of the importance of the guest machine, the nature of the customer or a combination of these and/or other such factors.

If it is determined that the guest virtual machine may be suspended, in some embodiments the guest virtual machine may 208 create a listener stub and/or cause a listener stub to be created as described herein and at least in connection with FIG. 1 and in accordance with at least one embodiment. The created listener stub 212 may be instantiated in a stub domain 210 that is configured to at least allow listener stubs to receive responses to requests and to process those responses. In some domains, a stub domain may be one or more processes operating on the host machine and, as may be contemplated, may be operating under the control of a controlling domain such as a hypervisor, or may be operating under the control of the host machine operating system or may be operating under the control of a combination of these and/or other such computer system entities.

Once the listening stub is available to process any responses that may come in, the guest virtual machine may be 214 suspended. In some embodiments, the guest virtual machine may inform a controlling domain such as a hypervisor that the machine is ready for suspension and may have some or all of its resources reclaimed for a length of time. In some embodiments the hypervisor may write the memory and/or other resource state of the guest virtual machine to a suspended virtual machine storage area 216 located in a suspend storage 218 under the control of a controlling domain such as a hypervisor as described herein and in accordance with at least one embodiment.

Figure 3:
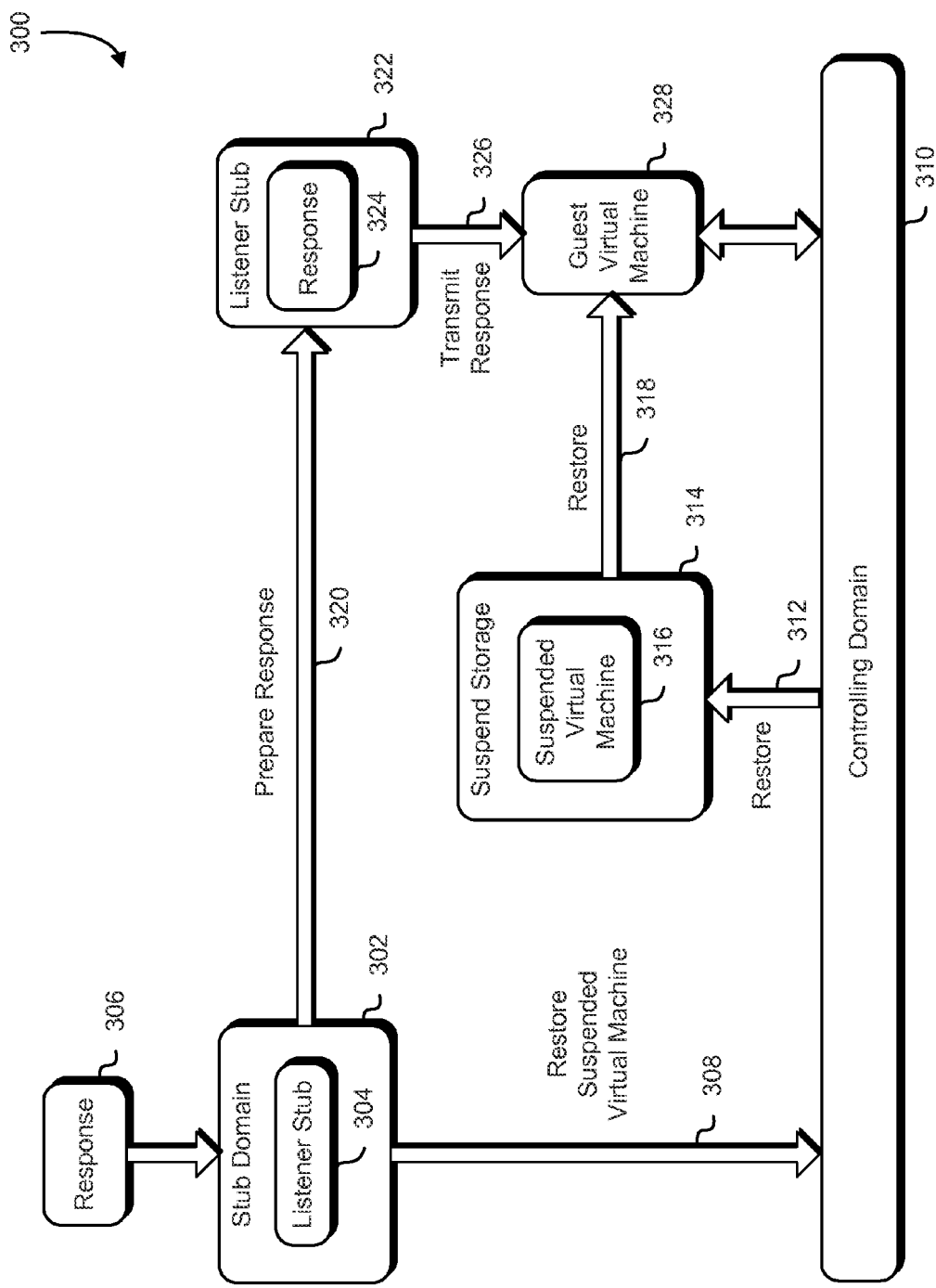
FIG. 3 illustrates an example environment where a guest virtual machine may be restored and may receive a response after being suspended in accordance with at least one embodiment.

FIG. 3 illustrates an example environment 300 where a guest virtual machine may be restored after receiving a response as described at least in connection with FIG. 1 and in accordance with at least one embodiment. A listener stub 304, instantiated in a stub domain 302 may receive a response 306 to a previous request. The listener stub 304 is equivalent to the listener stub 212 of FIG. 2. The stub domain is equivalent to the stub domain 210 of FIG. 2. In some embodiments, after the stub domain or one or more processes associated with the stub domain determine that the response is valid and that, as a result of the response, the suspended guest virtual machine may be restored, then the stub domain may alert a controlling domain such as a hypervisor 310 so that it may 308 restore the suspended virtual machine. The controlling domain or hypervisor, upon receiving an indication that the suspended guest virtual machine may be restored, may begin 312 restoring the suspended guest virtual machine by restoring memory and/or other resource state from 316 the suspended virtual machine stored in 314 the suspend storage. Once 318 the restore operation is complete the stub domain may then 320 prepare the response 324 so that the listener stub 322 may 326 transmit the response to 328 the restored guest virtual machine. The stub domain may prepare the response by receiving the response and copying it to the guest virtual machine, or by buffering and port forwarding the response to the guest virtual machine, or by duplicating receiving network transport objects between the stub domain and the guest virtual machine or by a combination of the these and/or other such methods. As may be contemplated, the stub domain, the guest virtual machine, the suspend storage and the controlling domain may use a variety of one or more processes or system resources to prepare the response and/or to transmit it to the guest virtual machine and other methods of preparing and/or transmitting the response may be considered as within the scope of this disclosure.

Figure 4:
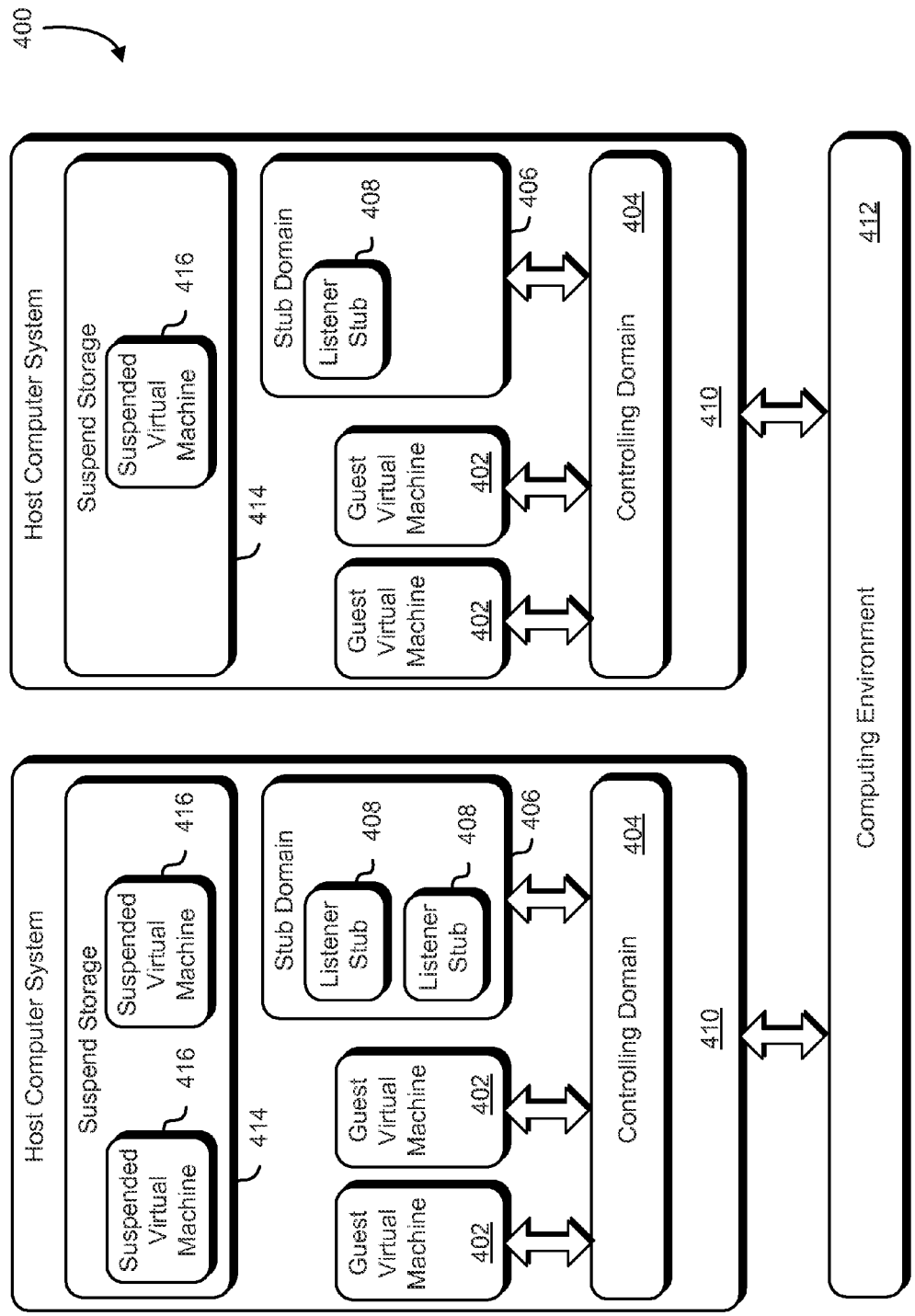
FIG. 4 illustrates an example environment where one or more guest virtual machines on one or more host computer systems in a distributed environment may be suspended in accordance with at least one embodiment.

As mentioned previously at least in connection with FIG. 1, a computer system may provide hosting and/or resources for one or more virtual machines. FIG. 4 illustrates a distributed and/or virtual computing environment 400 for suspending one or more of a plurality of guest virtual machines while waiting for a response and restoring those guest virtual machines after receiving a response as described at least in connection with FIG. 1 and in accordance with at least one embodiment. One or more guest virtual machines 402 may be operating on one or more controlling domains 404 that may in turn be operating on one or more host computer systems 410. Each of the one or more host computer systems may in turn be operating within a distributed and/or datacenter computing environment 412 such as a local and/or regional data center with a plurality of hosts and a plurality of guest computing systems. As may be contemplated, each host computing system may have, at any particular time, one or more suspended virtual machines 416 that may be waiting for responses to requests and that may, in some embodiments, have their pre-suspension memory and/or resource state stored in 414 a suspend storage as described at least in connection with FIG. 1 and in accordance with at least one embodiment. For each suspended virtual machine, there may be one or more listening stubs 408 instantiated within a stub domain 406 that may be at least configured to instantiate listening stubs and provide functionality to receive and process replies or responses to requests sent out by the virtual machines as described at least in connection with FIG. 1 and in accordance with at least one embodiment. As may be contemplated, the host computer systems illustrated in environment 400 may be running on a distributed and/or virtual computer system such as may be found in a data center and these systems may be made available to customers and other types of users for various tasks. In such examples, the computer system, service or resource that receives the request and prepares the potentially delayed response may be located on another guest machine on the same host, or on another guest machine on a different host in the same computing environment, or on another machine in a different location such as a remote data center, customer site, server or other such locations.

Figure 5:
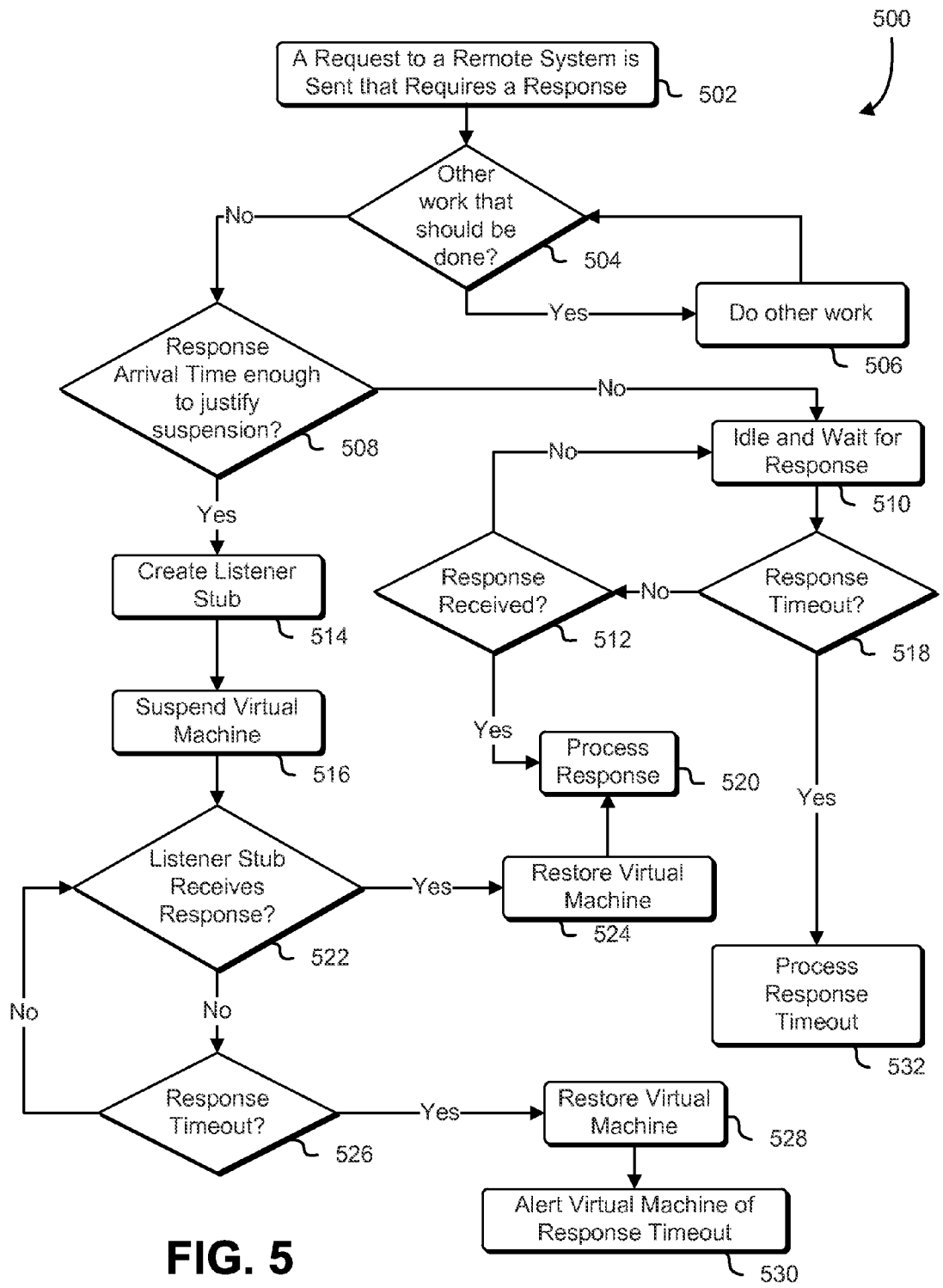
FIG. 5 illustrates an example process for suspending guest virtual machine while they are waiting for a response and restoring those guest virtual machines when the response is received may be performed in accordance with at least one embodiment.

FIG. 5 illustrates an example process 500 for sending a request, suspending a guest virtual machine, receiving a response and restoring the guest virtual machine as described at least in connection with FIG. 1 and in accordance with at least one embodiment. In some embodiments, a guest virtual machine such as the guest virtual machine 202 as described at least in connection with FIG. 2 may perform at least a portion of process 500. In some embodiments, a controlling domain such as, for example, the hypervisor 204 as described at least in connection with FIG. 2 may perform at least a portion of process 500. In some embodiments, a response listener such as the stub domain 208 as described at least in connection with FIG. 2 may perform at least a portion of process 500. The guest virtual machine may be one of a set of guest virtual machines as described at least in connection with FIG. 4. The controlling domain may be one of a set of controlling domains as described at least in connection with FIG. 4. The response listener may be one of a set of response listeners as described at least in connection with FIG. 4. One or more of the computer system entities illustrated in FIGS. 1-4 and/or any other such computer systems, resources or services may perform at least a portion of the process illustrated in FIG. 5.

When 502 a guest computer system sends a request to a remote system that requires a response as described at least in connection with FIG. 1 and in accordance with at least one embodiment, the guest computer system may 504 determine whether there is any other work that should be done. A guest computer system may determine whether there is any other work that should be done instead of and/or prior to suspension based on a number of factors associated with the guest computer system and also with a number of factors associated with a host system or with other guest computer systems that may be running on that host system, including, but not limited to, the nature and/or criticality of the work remaining on the guest computer system, the presence and degree of any resource shortages on the host machine, the amount and/or type of the resources associated with the guest computer system, the nature of the guest computer system, the owner and/or customer of the guest computer system or a combination of these and/or other such factors. For example, a guest computer system may determine that, while it has work that it could do, it may be better to delay performance of that work both because that work is not very critical and because the host system has a high level of need for the resources associated with that guest computer system. In another example, the host system that contains the guest computer system in question or another guest running on the host system may have a strong need for the resources, but the work under consideration is critical for the guest computer system. As may be contemplated, these examples are merely illustrative and other such methods and factors for determining whether to perform other work before suspension may be considered as within the scope of the present disclosure.

In the event 504 that the guest computing system determines that there is other work that should be done, then 506 the guest computer system may perform that other work. After that other work is performed, the guest computer system may once again determine whether any of the work in its list of items is more important than suspending the guest and releasing the resources. The guest computing system may make this determination based on the previous set of factors and/or on a new set of factors. In the event 504 that it is determined that there is no more work that should be done, the guest computer system may next determine 508 whether the response arrival time is far enough in the future to justify suspension of the guest machine. As mentioned previously at least in connection with FIG. 1 and in accordance with at least one embodiment, the determination of whether the response arrival time is far enough in the future to justify suspension of the guest machine may depend on a variety of measurements and factors including, but not limited to, a predicted, estimated, measured or known length of time for the response, the amount of time that it may take to suspend and restore the guest virtual machine, the degree of resource need on the host system, the amount of resources associated with the guest virtual machine or a combination of these and/or other such factors and measurements. As may be contemplated, if in step 504 the guest computer system spent at least a portion of the expected response time doing other work, then the amount of time spent may also be a factor in determining whether or not to suspend the guest virtual machine.

If the guest computer system determines 508 that the response arrival time is far enough in the future to justify suspension, then the guest computer system may 514 create a listener stub 514 as described at least in connection with FIG. 1 and in accordance with at least one embodiment. Once the listener stub is created, the guest computer system may 516 request suspension of itself by contacting a controlling domain on the host machine such as a hypervisor or domain zero and the controlling domain may then suspend the guest computer system as described at least in connection with FIG. 1 and in accordance with at least one embodiment. At some point after suspending the guest computer system, the listener stub may 522 receive a response to the request and may, in order to complete the process of receiving that request as described at least in connection with FIG. 1 and in accordance with at least one embodiment, 524 restore the guest computer system so that it may 520 process the response. At some point after suspending the guest computer system, the listener stub may 526 experience a response timeout if, for example, the response or reply does not arrive within a set time as determined by the guest computer system, or by the host system, or by the stub domain, or by the controlling domain on the host system or by a combination of these and/or other such computer system entities. In the event that there is a response timeout, the stub domain may 528 restore the guest computer system and may 530 alert the restored guest virtual machine that no response was received before the response timeout. As may be contemplated, the operations illustrated by steps 522 and 526 in process 500 may be performed asynchronously and/or simultaneously under the control of such systems as event handlers, signal processors, polling, or other such systems and these and/or other such methods of determining whether a response has been received, whether a timeout has occurred or whether other such similar events or conditions have occurred may be considered as within the scope of the present disclosure.

In some embodiments, if the guest computer system determines 508 that the response arrival time is not far enough in the future to justify suspension, then the guest machine may elect to avoid suspension and 510 idle while waiting for the response to return. As illustrated herein, a system that remains idle and that is not suspended while waiting for a response may, in some embodiments, experiencing a response timeout 518 which may engender 532 the guest computer system processing of the response timeout, which may include such actions as issuing an error, resending the request, alerting a user, logging the timeout in a system and/or application log or a combination of these and/or other such actions. At some point after beginning 510 to idle while waiting for the response, the guest computer system may 512 receive a response and 520 process the response. As may be contemplated, the operations illustrated by steps 510, 512 and 518 in process 500 may be performed asynchronously and/or simultaneously under the control of such systems as event handlers, signal processors, polling, or other such systems and these and/or other such methods of determining whether a response has been received, whether a timeout has occurred or whether other such similar events or conditions have occurred may be considered as within the scope of the present disclosure.

Figure 6:
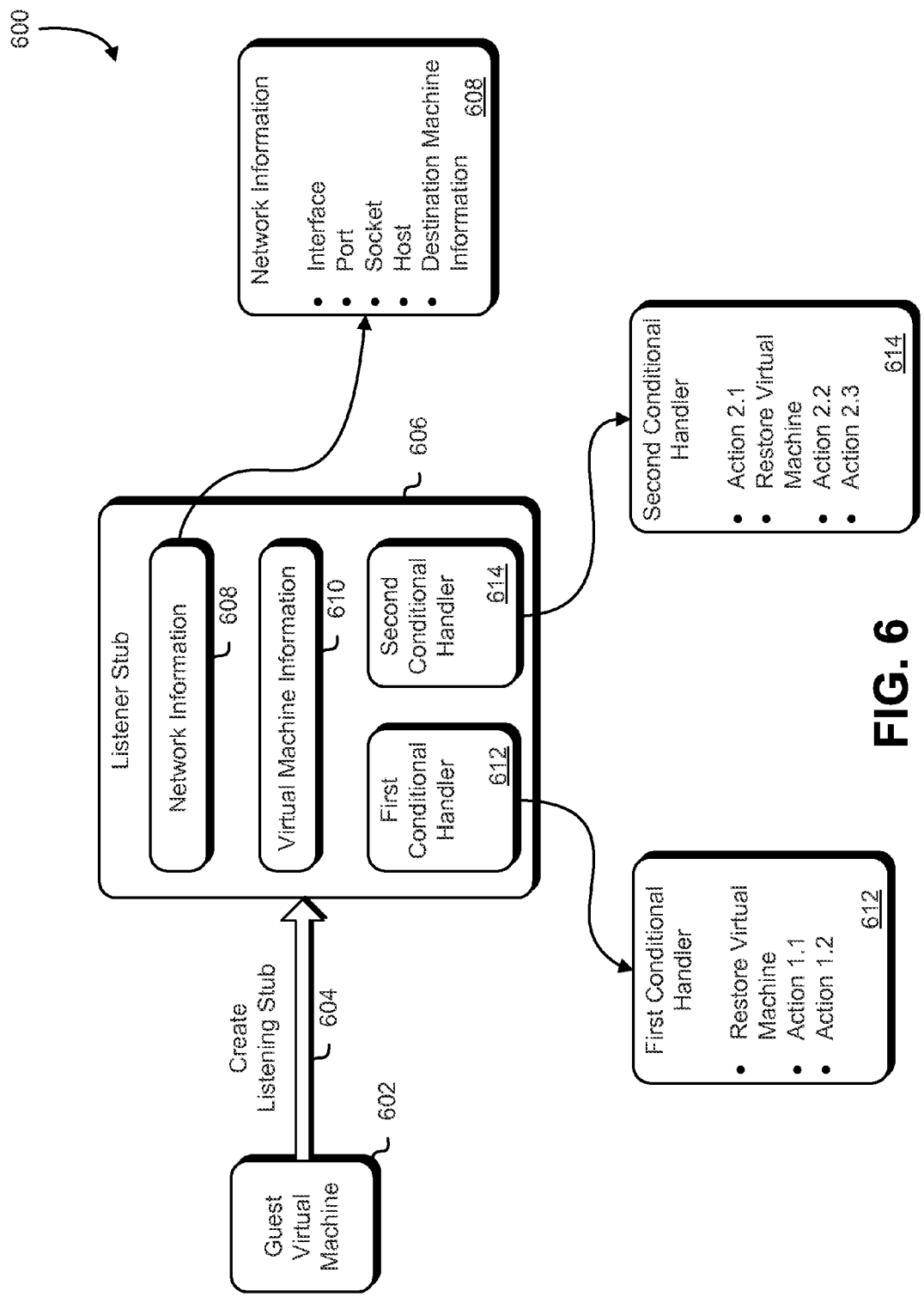
FIG. 6 illustrates an example environment where a guest virtual machine may create a listener stub in accordance with at least one embodiment.

FIG. 6 illustrates an example environment 600 where a guest virtual machine may create a listener stub as described at least in connection with FIGS. 1-3 and in accordance with at least one embodiment. A guest virtual machine 602 may 604 create a listener stub in order to facilitate suspension of the guest virtual machine while it is waiting for a response or reply to a request as described at least in connection with FIGS. 1-3 and in accordance with at least one embodiment. The listener stub 606 may contain a variety of information that may be required to receive and/or process the response or responses that may come in. In some embodiments, the listener stub may contain 608 network information that at least describes how and where the stub listener may listen for the response or reply to the request that was sent out. The network may include such information as a network interface description or identifier, a network port description or identifier, a network socket description or identifier, a host identifier for the guest virtual machine, a set of information about the destination machine that may be sending the response or a combination of these and/or other such network information objects. As may be contemplated, the content of the network information may depend on a variety of factors and may contain a variety of different objects depending on, for example, such factors as differences in network protocols, differences in guest virtual machine configurations, differences in host system configurations, differences in responding system, resource or entity configurations, differences in the nature and/or type of the request, differences in the nature and/or types of the response or responses or a combination of these and/or other such factors.

A listener stub may, in some embodiments, contain 610 information about the guest virtual machine including, but not limited to, identifiers of the machine, its suspension state, the controlling domain, hypervisor or domain zero that supervises its operation and other such information. A listener stub may also contain one or more conditional handlers that describe how to process certain responses. For example, a listener stub may contain 612 a first conditional handler which may be executed by a process or processes and which may be at least configured to restore the suspended guest virtual machine before performing a series of one or more other actions. A listener stub may also contain, for example, 614 a second conditional handler which may be executed by a process or processes and which may be at least configured to perform one or more actions before restoring the guest virtual machine and performing a series of one or more other actions. As may be contemplated, the instructions in the conditional handlers may be scripted, or may contain sections of executable code or modules, or may include combinations of other such executable or interpretable processes or procedures and as also may be contemplated, the instructions may be executed and/or processed by a process or processes under the control of the listener stub or may be executed and/or processed by a process or processes under the control of some other computer system entity.

Figure 7:
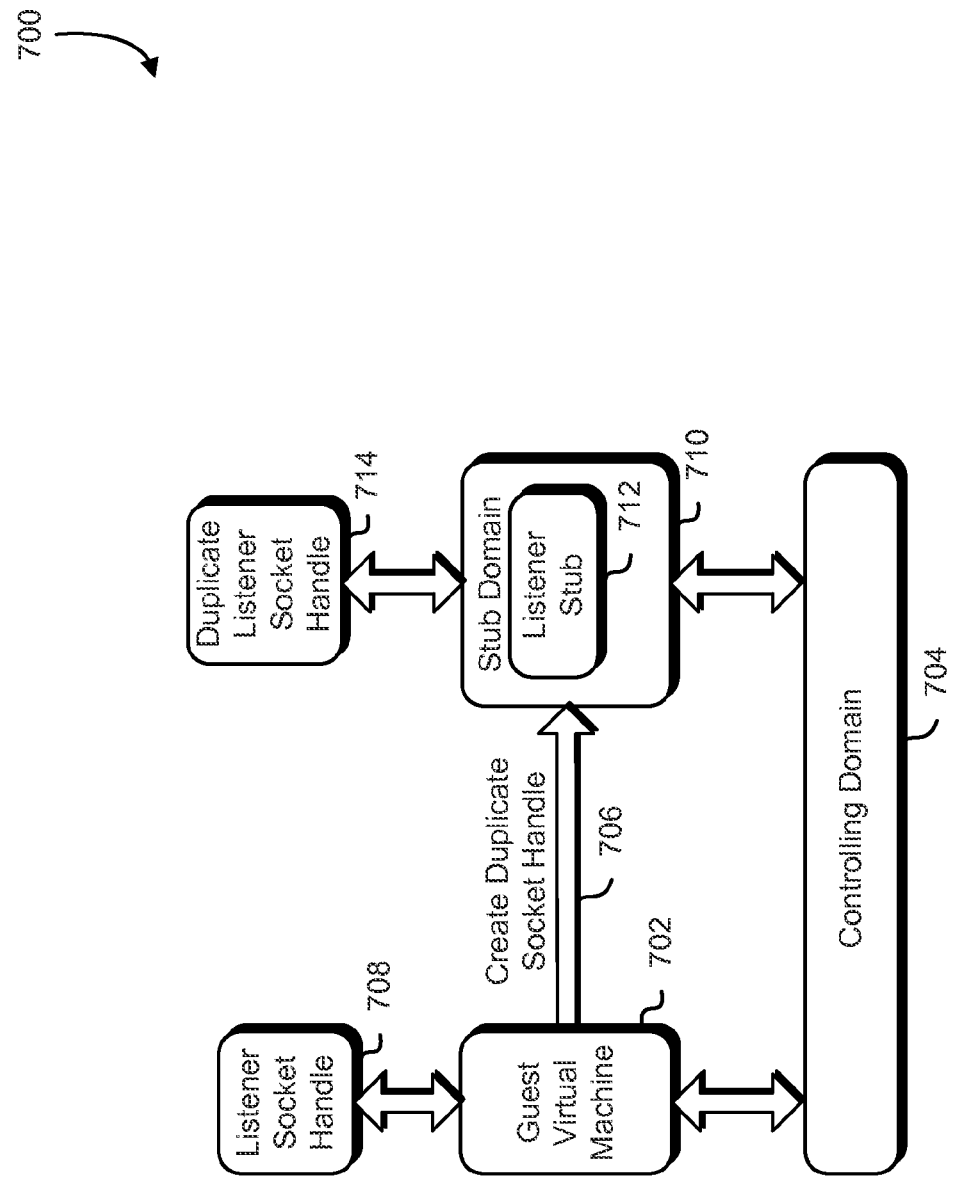
FIG. 7 illustrates an example environment where a guest virtual machine may create a listener socket on a stub domain by creating a duplicate socket in accordance with at least one embodiment.

FIG. 7 illustrates an example environment 700 where a guest virtual machine may create a listener socket by instructing a stub domain to duplicate an existing listener socket. In some embodiments, a guest virtual machine 702, running on a controlling domain 704 such as a hypervisor or domain zero may have, as part of sending out a request that requires a response or reply, created and/or designated a listener socket handle 708 that the response or reply may be sent to. If the system makes the determination that the expected response is far enough in the future to justify creating a listener stub and suspending the guest virtual machine as described herein at least in connection with FIG. 5 and in accordance with at least one embodiment, then as part of creating the listener stub 712 on the stub domain 710, the guest virtual machine may 706 request or instruct a process or processes on the stub domain, or under the control of the stub domain, or under the control of the controlling domain, or under the control of another such entity to create a duplicate socket handle. The duplicate socket handle 714 may be at least as similar to the listener socket handle 708 so that the duplicate socket handle may receive the response on behalf of the listener socket handle when the response arrives at the stub domain. As may be contemplated, the duplication of the listener socket handle as described in FIG. 7 is merely an illustrative example and other methods and mechanisms of duplicating a listener socket handle at the stub domain may be considered as within the scope of the present disclosure. For example, the listener socket handle may be included as part of the network information 608 from FIG. 6 or it may be sent separately either before or after the listener stub is created.

Figure 8:
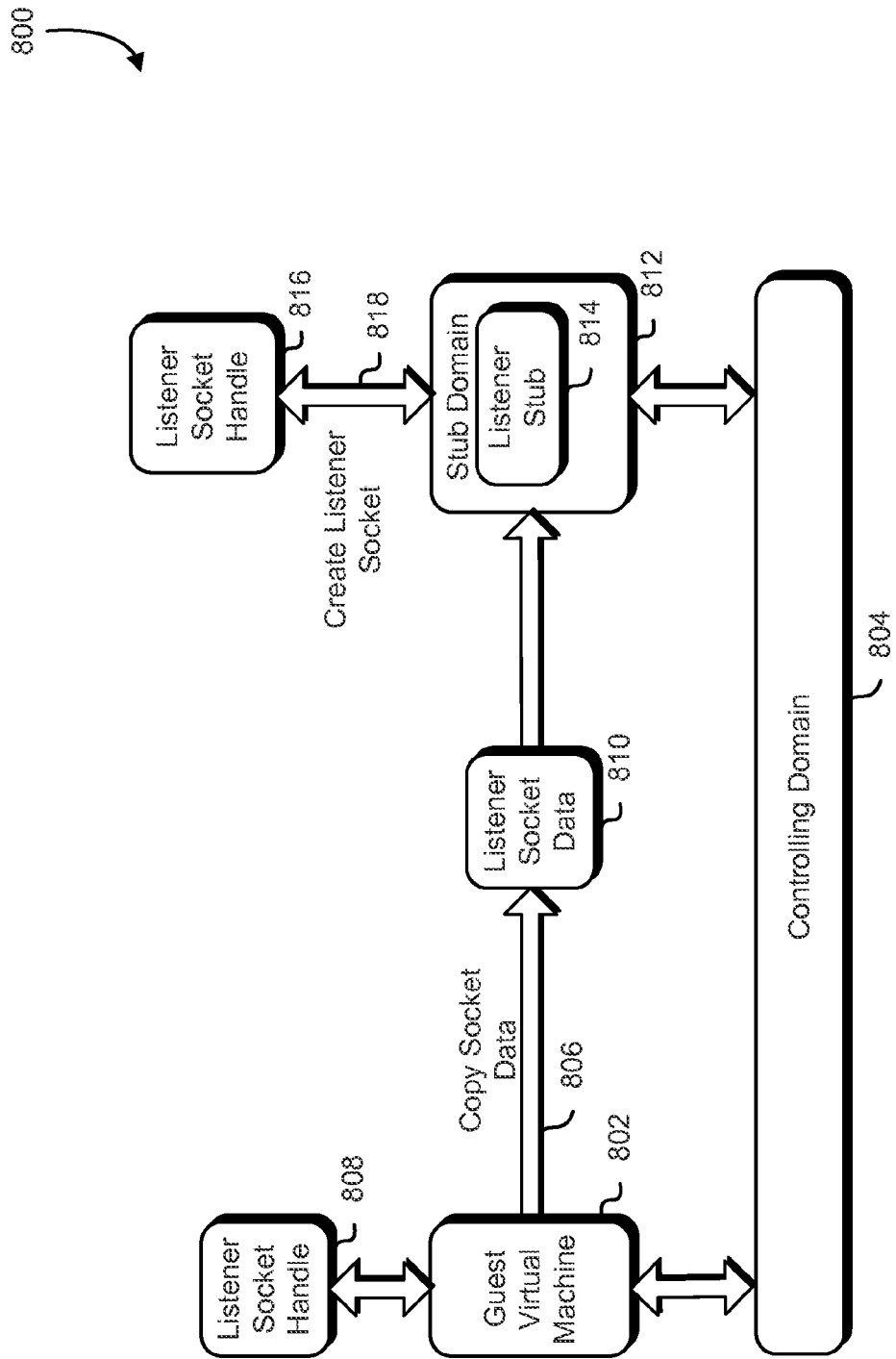
FIG. 8 illustrates an example environment where a guest virtual machine may create a listener socket on a stub domain by instructing the stub domain to create a listener socket in accordance with at least one embodiment.

FIG. 8 illustrates an example environment 800 where a guest virtual machine may instruct a stub domain to create a listener socket by sending a set of instructions and/or data that enable the stub domain to create an appropriate socket handle. In some embodiments, a guest virtual machine 802, running on a controlling domain 804 such as a hypervisor or domain zero may have, as part of sending out a request that requires a response or reply, created and/or designated a listener socket handle 808 that the response or reply may be sent to. If the system makes the determination that the expected response is far enough in the future to justify creating a listener stub and suspending the guest virtual machine as described herein at least in connection with FIG. 5 and in accordance with at least one embodiment, then as part of creating the listener stub 814 on the stub domain 812, the guest virtual machine may 806 create a copy of the listener socket data 810 that at least describes the listener socket handle 808. The listener socket data may then be transferred to the stub domain 812 and may, in some embodiments, be associated with the appropriate listener stub 814. A process or processes on the stub domain, or under the control of the stub domain, or under the control of the controlling domain, or under the control of another such entity may then 818 create a listener socket handle 816 which may be at least as similar to the listener socket handle 808 so that the duplicate socket handle may receive the response on behalf of the listener socket handle when the response arrives at the stub domain. As may be contemplated, the creation of the listener socket handle via a descriptive message as described in FIG. 8 is merely an illustrative example and other methods of creating an appropriate listener socket handle at the stub domain may be considered as within the scope of the present disclosure. For example, the description of the listener socket handle may include such mechanisms as serializing the socket handle to a message and sending the serialized handle to the listener stub, or may include instructions to simply allocate a listener handler from a set of listener handlers that may mimic an appropriate handle, or it may include instructions to listen on a certain queue or it may include combinations of these and/or other such instructions to create the listener socket handle.

Figure 9:
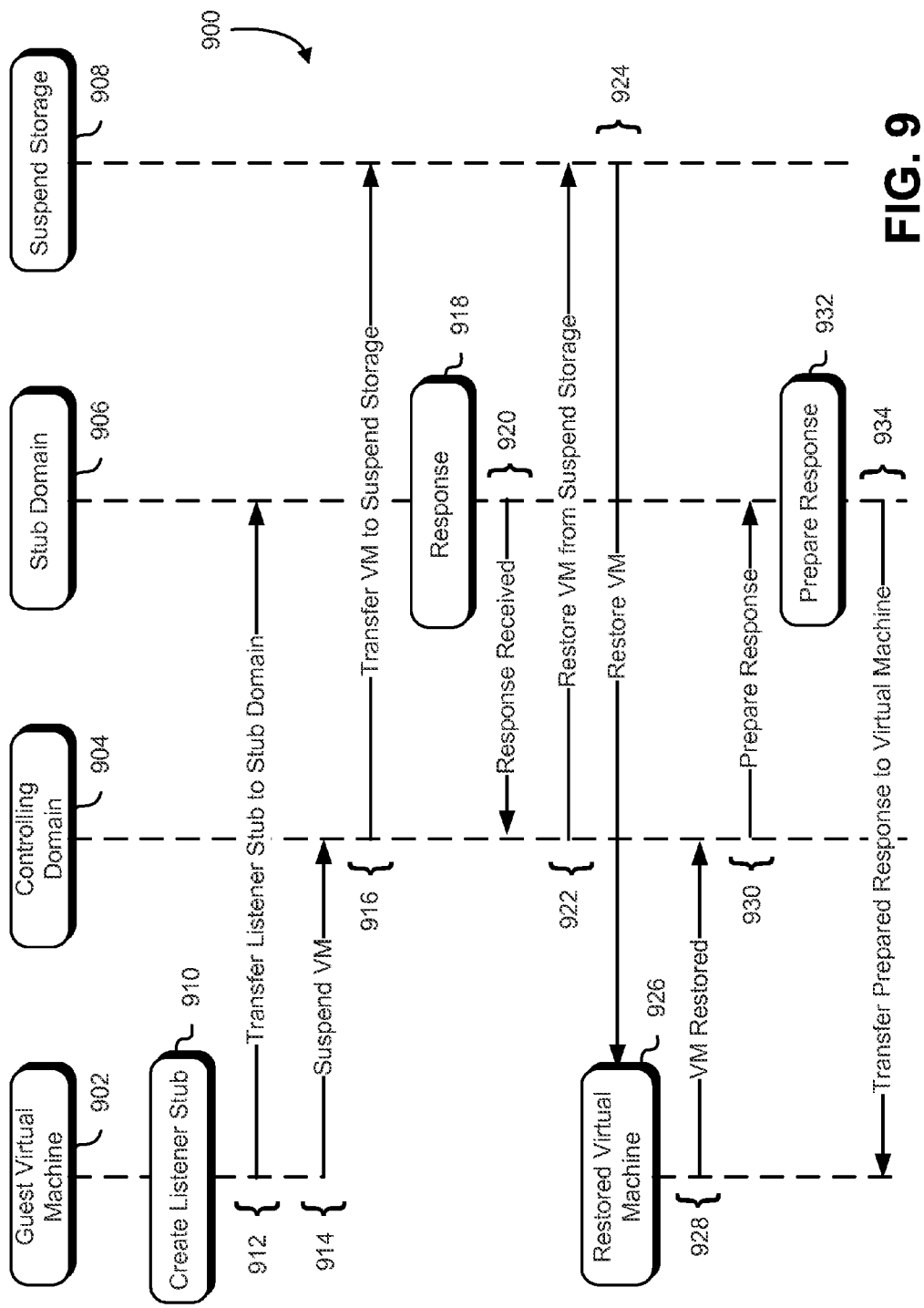
FIG. 9 illustrates an example process and timeline for creating a listener stub, suspending a guest virtual machine, receiving a response, restoring the suspended guest virtual machine and forwarding the response to the restored guest virtual machine in accordance with at least one embodiment.

FIG. 9 illustrates an example process and timeline 900 for creating a listener stub, suspending a guest virtual machine, receiving a response or reply to a previous request, restoring the guest virtual machine, and forwarding the response to the restored guest virtual machine as described at least in connection with FIG. 1 and in accordance with at least one embodiment. In some embodiments, a guest virtual machine such as the guest virtual machine 202 as described at least in connection with FIG. 2 may perform at least a portion of process 900. In some embodiments, a controlling domain such as, for example, the hypervisor 204 as described at least in connection with FIG. 2 may perform at least a portion of process 900. In some embodiments, a response listener such as the stub domain 208 as described at least in connection with FIG. 2 may perform at least a portion of process 900. In some embodiment, a suspend storage such as the suspend storage 218 as described at least in connection with FIG. 2 may perform at least a portion of process 900. The guest virtual machine may be one of a set of guest virtual machines as described at least in connection with FIG. 4. The controlling domain may be one of a set of controlling domains as described at least in connection with FIG. 4. The response listener may be one of a set of response listeners as described at least in connection with FIG. 4. The suspend storage may be one of a set of suspend storages as described at least in connection with FIG. 4. One or more of the computer system entities illustrated in FIGS. 1-4 and/or any other such computer systems, resources or services may perform process 900 illustrated in FIG. 9.

As a result of sending out a request to a computer system, resource or entity that may take a length of time, a guest virtual machine 902 may 910 create a listener stub and 912 transfer the listener stub to a stub domain 906 as described at least in connection with FIG. 2 and in accordance with at least one embodiment. The guest virtual machine may then notify the controlling domain 904 that it may 914 suspend the guest virtual machine. If the controlling domain determines that the guest virtual machine is a good candidate for suspension, the controlling domain may suspend the operations of the guest virtual machine and may 916 transfer the memory and/or other such state information of the suspended guest virtual machine to suspend storage 908 as described at least in connection with FIG. 2 and in accordance with at least one embodiment. At some point in the future, the stub domain may receive 918 a response or reply to the request as described at least in connection with FIGS. 3 and 5 and may, in some embodiments, do some processing of the response before notifying the controlling domain that 920 a response was received. The controlling domain may then 922 request a restoration of the appropriate suspended guest virtual machine from the suspend store and the suspend storage and/or the controlling domain may then 924 begin restoring the suspended guest virtual machine. The restored guest virtual machine 926 may then 928 notify the controlling domain that the guest virtual machine has been restored and the controlling domain may then 930 notify the stub domain to prepare the response. In some embodiments, the restored guest virtual machine combine steps 928 and 930 and may notify the stub domain directly to prepare the response. The stub domain may then prepare the response 932 and may 934 transfer the prepared response to the restored guest virtual machine.

Figure 10:
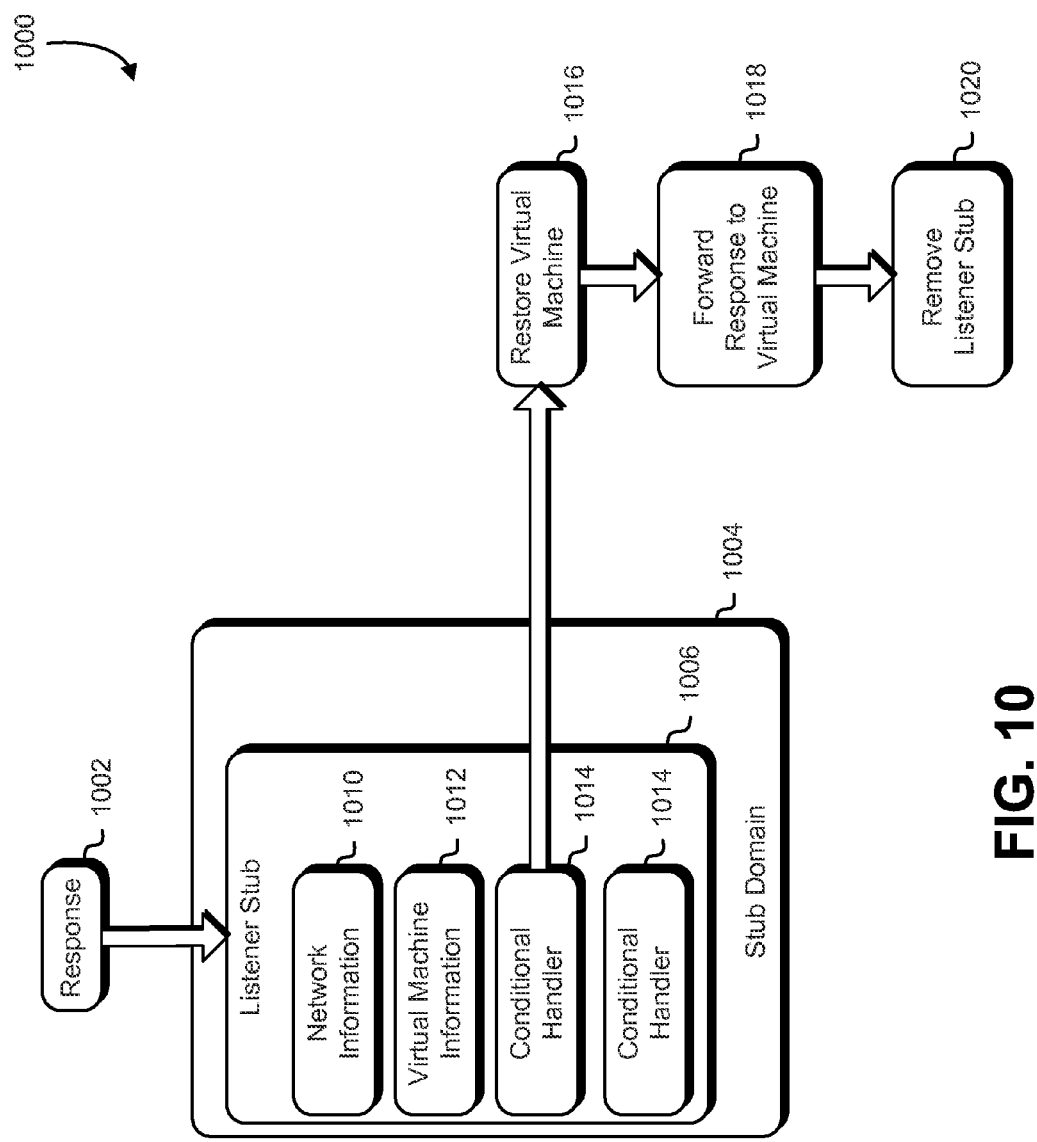
FIG. 10 illustrates an example environment where a stub domain may receive a response to a request in accordance with at least one embodiment.

FIG. 10 illustrates an example environment 1000 where a stub domain may receive a response or reply to a request as described at least in connection with FIGS. 3 and 5 and in accordance with at least one embodiment. A stub domain 1004 with a listener stub 1006 may receive a response 1002 from a computer system, service or resource as described at least in connection with FIG. 3 and in accordance with at least one embodiment. The listener stub may contain network information 1010, virtual machine information 1012 and one or more conditional handlers 1014 as described at least in connection with FIG. 6. As part of receiving the response, one or more processes associated with the stub domain may determine which of the conditional handlers is appropriate based on the response received. For example, one of the conditional handlers may be configured to accept the expected response, restore the virtual machine 1016 and forward the response to the restored virtual machine 1018. A different conditional handler may be configured to, for example, receive an error response and take some actions in response to that, or to receive an "OK" type response and take no actions in response to that. In some embodiments, a stub domain may perform a cleanup operation after the response is forwarded by at least taking one or more actions such as 1020, removing the listener stub. In some embodiments, where the same request may come in multiple times, the stub domain may elect to instead save and/or hibernate the listener stub until the next such request occurs. As may be contemplated, there are a number of other actions that the stub domain may take before, during or after receiving a response, restoring the guest virtual machine and forwarding the response and these other actions may be considered as within the scope of the present disclosure.

Figure 11:
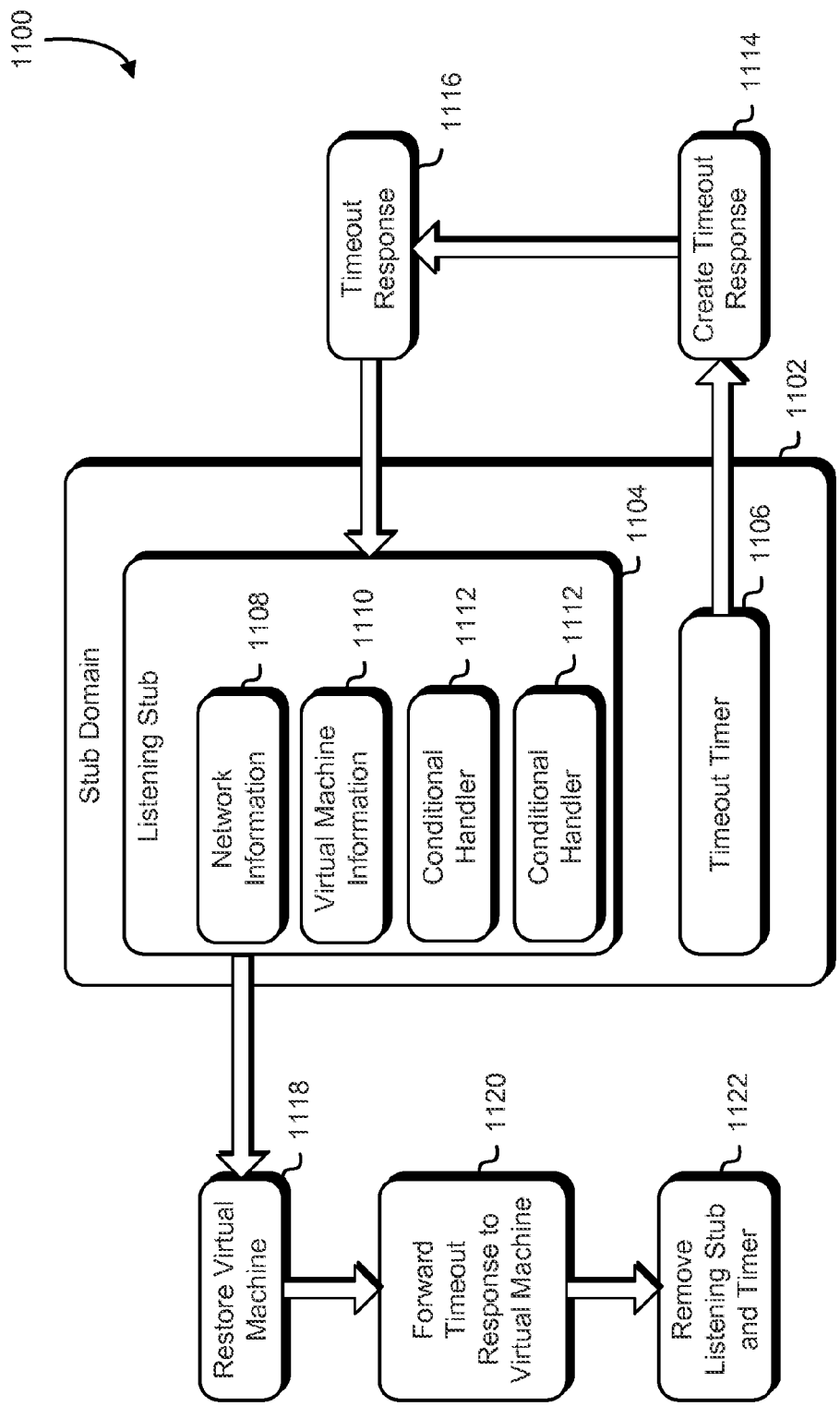
FIG. 11 illustrates an example environment where a stub domain may timeout before receiving a response to a request in accordance with at least one embodiment.

FIG. 11 illustrates an example environment 1100 where a stub domain may timeout before receiving a response or reply to a request as described at least in connection with FIG. 5 and in accordance with at least one embodiment. A stub domain 1102 with a listener stub 1104 may be waiting to receive a response from a computer system, service or resource as described at least in connection with FIG. 3 and in accordance with at least one embodiment. The listener stub may contain network information 1108, virtual machine information 1110 and one or more conditional handlers 1112 as described at least in connection with FIG. 6. The listener stub may also contain one or more timeout timers 1106 which may at least partially determine how long the stub domain may wait for a response or reply from a computer system, service or resource. In the event that a timeout timer expires as described at least in connection with FIG. 5, the stub domain may, in some embodiments, 1114 create an artificial response that mimics a timeout event and then may 1116 forward this timeout event response to the listening stub. As may be contemplated, the creation of an artificial response that mimics a timeout event may take advantage of built in timeout functionality or mechanisms in the listening stub, the stub domain, the host machine, the guest machine, the controlling domain or a combination of one or more of these and/or other such computer system entities. In some embodiments, the stub domain may avoid creating the artificial timeout response and may instead just proceed with cleanup as if such a timeout even had occurred. As part of receiving the timeout event or as part of determining to proceed as if such an event had occurred, one or more processes associated with the stub domain may determine if one of the conditional handlers is configured to respond to the timeout event and if so, may begin processing of that conditional handler. In some embodiments, the stub domain may also have a preconfigured and/or built in conditional handler to respond to a timeout event. Under control of the appropriate conditional hander, the stub domain may 1118 restore the suspended guest virtual machine and may 1120 forward the timeout to the restored guest virtual machine which may then elect to take one or more remedial actions. In some embodiments, a stub domain may clean up the after the response is forwarded by taking one or more actions such as 1122, removing the listener stub as described herein.

Figure 12:
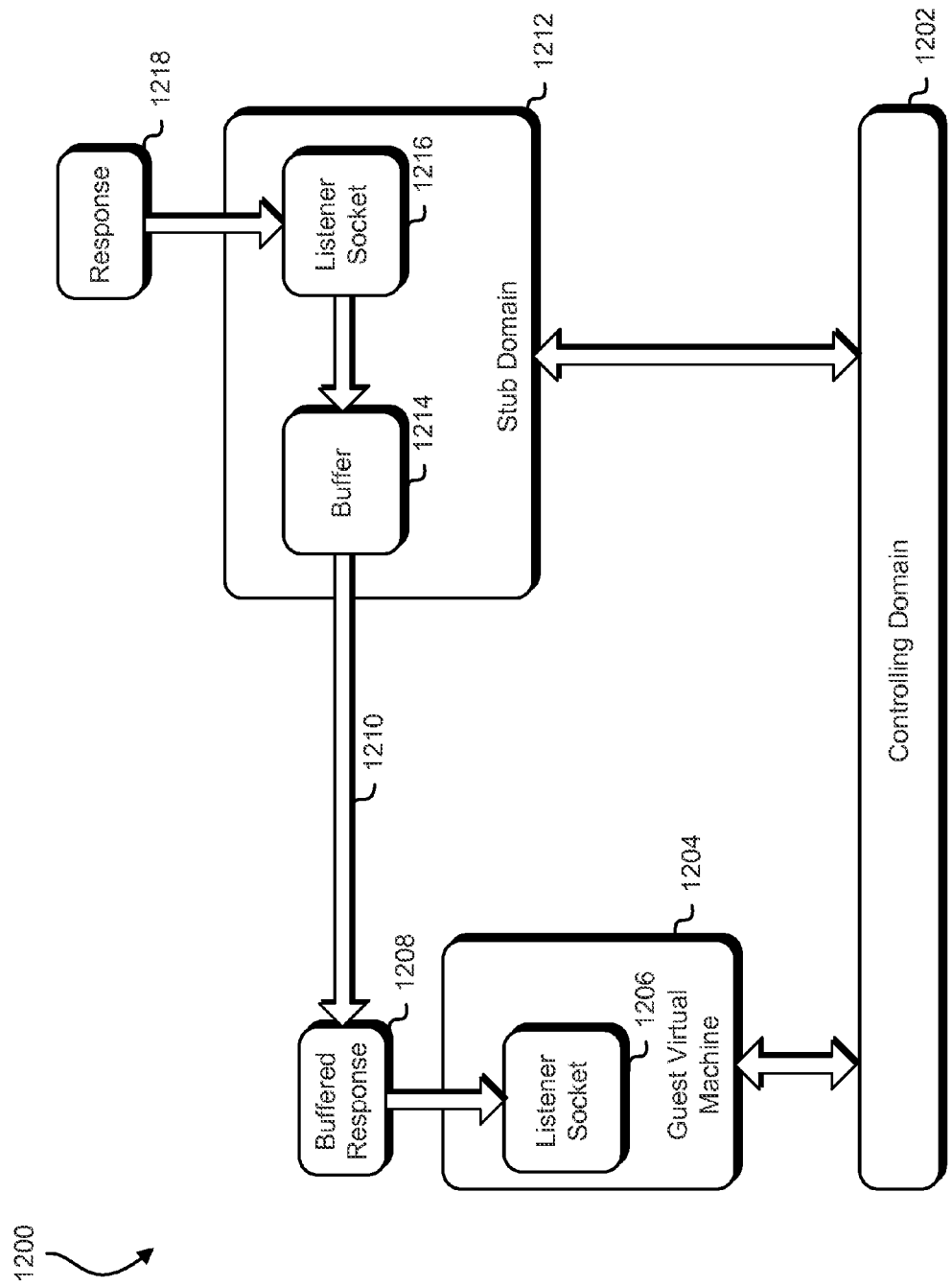
FIG. 12 illustrates an example environment where a response is received by a stub domain and forwarded to a restored guest virtual machine in accordance with at least one embodiment.

FIG. 12 illustrates an example environment 1200 where a response is received by a stub domain and is forwarded to a guest virtual machine as described at least in connection with FIG. 3 and in accordance with at least one embodiment. A stub domain 1212 running on a controlling domain 1202 such as a hypervisor or domain zero may receive a response 1218 on a listener socket 1216 configured to receive the response, as described at least in connection with FIGS. 7 and 8 and in accordance with at least one embodiment. The stub domain may 1214 buffer the response until the 1204 guest virtual machine is restored and then may begin 1210 sending the buffered response 1208 to the restored listener socket 1206 on the restored guest virtual machine 1204. As may be contemplated, the a process or processes running on the stub domain, or on the controlling domain, or on the host system, or on the restored guest virtual machine or on a combination of these and/or other such computer system entities may manage the buffering and forwarding of the response. For example, in some embodiments, the stub domain may have the original listener socket and the guest virtual machine may be restored with an altered listener socket that the controlling process or processes knows to forward to. In some embodiments, the stub domain may have an altered listener socket but the response may be intercepted by the controlling domain or the stub domain for forwarding. In some embodiments, the listener socket 1216 on the stub domain and the listener socket 1206 on the restored guest virtual machine may be duplicates and the response may only be partially buffered by the stub domain before the guest virtual machine begins to receive the response itself. As may be contemplated, these methods of receiving and forwarding the response or reply are illustrative examples and other methods of receiving and forwarding the response from the stub domain to the guest virtual machine may be considered as within the scope of the present disclosure.

Figure 13:
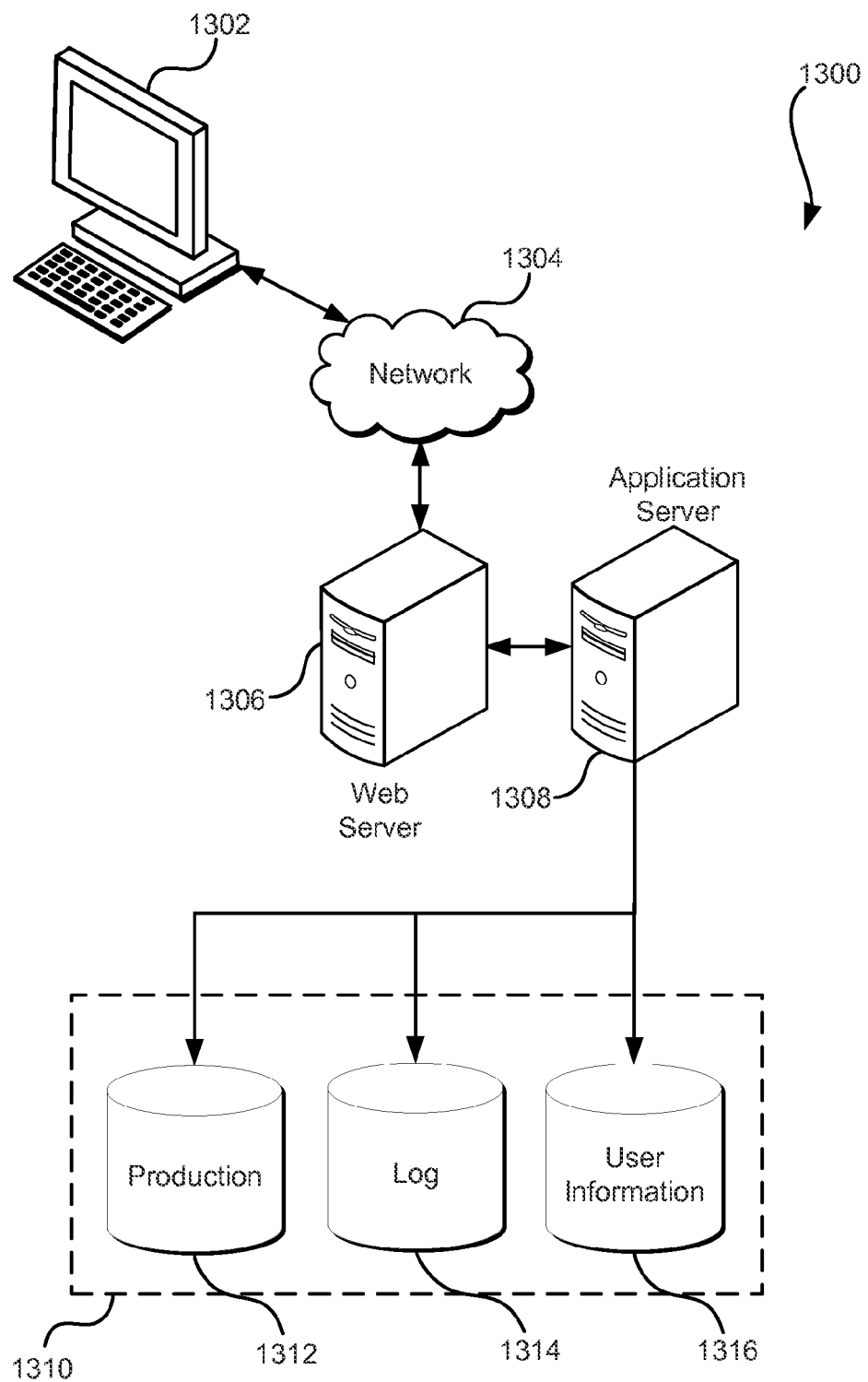
FIG. 13 illustrates an environment in which various embodiments can be implemented.

FIG. 13 illustrates aspects of an example environment 1300 for implementing aspects in accordance with various embodiments. As will be appreciated, although a web-based environment is used for purposes of explanation, different environments may be used, as appropriate, to implement various embodiments. The environment includes an electronic client device 1302, which can include any appropriate device operable to send and receive requests, messages or information over an appropriate network 1304 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed system.

The data store 1310 can include several separate data tables, databases or other data storage mechanisms and media for storing data relating to a particular aspect of the present disclosure. For example, the data store illustrated may include mechanisms for storing production data 1312 and user information 1316, which can be used to serve content for the production side. The data store also is shown to include a mechanism for storing log data 1314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for suspending a guest computing system while waiting for a response to a request and for reclaiming computer system memory from the guest computing system while waiting for the response, comprising:
    under the control of one or more computer systems configured with executable instructions,
        issuing the request from the guest computing system to a second computing system that is configured to at least receive and respond to the request;
        as a result of determining the response to the request will take a length of time greater than a threshold length of time, at least:
            constructing a listener stub configured to at least receive the response and comprising at least:
                a handling plan that at least includes a set of instructions for receiving the response; and
                a listener socket configured to at least receive a network communication from the second computing system;
            transferring the listener stub to a stub domain;
            suspending the guest computing system; and
            reclaiming at least a portion of the computer system memory from the guest computing system; and
        as a result of the listener stub receiving the response from the second computing system, at least:
            executing one or more of the instructions in the handling plan according to the response received;
            restoring the guest computing system; and
            forwarding the response from the stub domain to the guest computing system.

2. The computer-implemented method of claim 1, wherein the threshold length of time is based at least in part on a length of time to suspend and restore the guest computing system.

3. The computer-implemented method of claim 1, wherein the threshold length of time is based at least in part on an amount of available computer system memory on the guest computing system.

4. The computer-implemented method of claim 1, wherein the listener socket is created by the guest computing system and transferred to the stub domain as part of the listener stub.

5. The computer-implemented method of claim 1, wherein the listener socket is created by the stub domain based at least in part on one or more configuration parameters sent from the guest computing system to the stub domain as part of the listener stub.

6. The computer-implemented method of claim 1, wherein:
    the listener stub further comprises a timer that is started when the listener stub is transferred to the stub domain; and
    the stub domain is configured to respond to an expiration of the timer by at least:
        restoring the guest computing system;

restoring the computer system memory to the guest computing system; and forwarding a timeout response from the stub domain to the guest computing system.

7. A computer system, comprising:

one or more processors; and memory including executable instructions that, when executed by the one or more processors, cause the computer system that is waiting for a response to a request issued by a guest computing system in a first domain of a virtualization environment, to at least:

as a result of determining the response to the request will take a length of time greater than a threshold length of time:

transfer a listener stub configured to at least receive the response to a stub domain of the virtualization environment, the listener stub comprising a listener socket;

suspend the guest computing system; and reclaim resources from the guest computing system, the resources including computer system memory; and as a result of the listener stub receiving at least a portion of the response, resulting in a received response, cause the listener stub to at least:

restore the guest computing system; and forward the response to the guest computing system.

8. The computer system of claim 7, wherein the instructions further comprise instructions that, when executed by the one or more processors, cause the system, prior to constructing the listener stub, determine whether to construct the listener stub based at least in part on a determination that an expected length of time to obtain the response to the request exceeds the threshold length of time.

9. The computer system of claim 8, wherein the threshold length of time is based at least in part on one or more measurements of available system resources.

10. The computer system of claim 7, wherein the instructions further comprise instructions that, when executed by the one or more processors, cause the system, prior to constructing the listener stub, to determine whether to construct the listener stub based at least in part on a nomination sent from the guest computing system to a controlling domain wherein the nomination at least contains a notification to suspend the guest computing system.

11. The computer system of claim 7, wherein:

the listener socket is configured to at least receive the response over a network attached to the computer system; and the listener stub comprises a handling plan at least comprising a set of instructions, one or more of which may be executed when the response is received.

12. The computer system of claim 7, wherein:

the stub domain is configured to at least:

receive the response; and perform one or more actions as a result of receiving the response according to one or more sets of instructions for the listener stub.

13. The computer system of claim 7, wherein, to restore the guest computing system, the listener stub is configured to wait until the received response is completely received.

14. The computer system of claim 7, wherein the resources include at least computer system memory.

15. The computer system of claim 7, wherein forwarding the response to the guest computing system causes the computer system to at least:

create a duplicate copy of a network socket where the response is received; and forward the duplicate copy of the network socket to the guest computing system.

16. The computer system of claim 7, wherein the response comprises a first portion that is received before the computer system is restored and a second portion that is received after the computer system is restored, and forwarding the response to the guest computing system causes the computer system to at least:

buffer the first portion of the response to result in a buffered first portion of the response;

forward the buffered first portion of the response to the guest computing system to result in a forwarded buffered first portion of the response; and join the forwarded buffered first portion of the response with the second portion of the response.

17. A non-transitory computer-readable storage medium having collectively stored thereon executable instructions that, when executed by one or more processors of a computer system, cause the computer system to at least:

as a result of determining a response to a request will take a length of time greater than a threshold length of time, cause a guest computing system in first domain of a virtualization environment to wait for the response by at least:

transferring, to a stub domain of the virtualization environment, a listener stub configured to at least receive the response, the listener stub comprising a listener socket; and reclaiming resources from the guest computing system, the resources comprising computer system memory; and as a result of the listener stub receiving at least a portion of the response, cause the listener stub to process the response by:

restoring resources to the guest computing system; and forwarding the response to the guest computing system.

18. The non-transitory computer-readable storage medium of claim 17, wherein the instructions further comprise instructions that, when executed by the one or more processes, cause the computer system to determine whether to implement the listener stub based at least in part on an expected amount of time to receive the response from the stub computing system.

19. The non-transitory computer-readable storage medium of claim 17, wherein the instructions further comprise instructions that, when executed by the one or more processes, cause the computer system to, prior to implementing the listener stub, determine whether to implement the listener stub based at least in part on the threshold length of time, wherein the threshold length of time is based at least in part on one or more measurements of availability of the resources.

20. The non-transitory computer-readable storage medium of claim 17, wherein the instructions that cause the computer system to reclaim resources from the guest computing system further include instructions that cause the computer system to suspend the guest computing system.

21. The non-transitory computer-readable storage medium of claim 17, wherein the instructions that cause the computer system to restore resources from the guest computing system further include instructions that cause the computer system to restore the guest computing system from a suspended state.

22. The non-transitory computer-readable storage medium of claim 17, wherein the instructions further comprise instructions that cause the computer system to:
  receive the response; and
  perform one or more actions as a result of receiving the response according to one or more sets of instructions in the listener stub.

23. The non-transitory computer-readable storage medium of claim 17, wherein the guest computing system resources include at least computer system memory.

24. The non-transitory computer-readable storage medium of claim 17, wherein the instructions that cause the computer system to forward the response to the guest computing system further include instructions that cause the computer system to:
  buffer the portion of the response that is received before resources are restored to the guest computing system to result in a buffered portion of the response;
  forward the buffered portion of the response to the guest computing system to result in a forwarded portion of the response; and
  join the forwarded portion of the response with any portion of the response that is received after resources are restored to the guest computing system.

* * * * *